United States Patent
Kumar et al.

(10) Patent No.: US 11,727,614 B2
(45) Date of Patent: Aug. 15, 2023

(54) WEB-BASED DIGITAL IMAGE EDITING IN REAL TIME UTILIZING A LATENT VECTOR STREAM RENDERER AND AN IMAGE MODIFICATION NEURAL NETWORK

(71) Applicant: Adobe Inc., San Jose, CA (US)

(72) Inventors: Akhilesh Kumar, San Jose, CA (US); Baldo Faieta, San Francisco, CA (US); Piotr Walczyszyn, Warsaw (PL); Ratheesh Kalarot, San Jose, CA (US); Archie Bagnall, Irvine, CA (US); Shabnam Ghadar, Menlo Park, CA (US); Wei-An Lin, San Jose, CA (US); Cameron Smith, Santa Cruz, CA (US); Christian Cantrell, Sterling, VA (US); Patrick Hebron, Briarcliff Manor, NY (US); Wilson Chan, San Jose, CA (US); Jingwan Lu, Santa Clara, CA (US); Holger Winnemoeller, Seattle, WA (US); Sven Olsen, Victoria (CA)

(73) Assignee: Adobe Inc., San Jose, CA (US)

(*) Notice: Subject to any disclaimer, the term of this patent is extended or adjusted under 35 U.S.C. 154(b) by 205 days.

(21) Appl. No.: 17/182,492

(22) Filed: Feb. 23, 2021

(65) Prior Publication Data
US 2022/0270310 A1 Aug. 25, 2022

(51) Int. Cl.
*G06T 11/60* (2006.01)
*G06T 11/20* (2006.01)
*G06N 3/04* (2023.01)

(52) U.S. Cl.
CPC .............. *G06T 11/60* (2013.01); *G06N 3/04* (2013.01); *G06T 11/203* (2013.01)

(58) Field of Classification Search
CPC ....... G06T 11/60; G06T 11/203; G06T 3/0012; G06N 3/04
See application file for complete search history.

(56) References Cited

U.S. PATENT DOCUMENTS

| | | | |
|---|---|---|---|
| 2008/0165141 A1* | 7/2008 | Christie | G06F 3/0482 345/173 |
| 2020/0356591 A1* | 11/2020 | Yada | G06F 16/5862 |
| 2021/0342496 A1* | 11/2021 | Spies | G06T 11/60 |

OTHER PUBLICATIONS

Zhu, Jun-Yan et al. "Generative Visual Manipulation on the Natural Image Manifold"; in European Conference on Computer Vision (ECCV); Sep. 25, 2016.

(Continued)

*Primary Examiner* — Jacinta M Crawford
*Assistant Examiner* — Andrew Shin
(74) *Attorney, Agent, or Firm* — Keller Preece PLLC

(57) ABSTRACT

The present disclosure describes systems, methods, and non-transitory computer readable media for detecting user interactions to edit a digital image from a client device and modify the digital image for the client device by using a web-based intermediary that modifies a latent vector of the digital image and an image modification neural network to generate a modified digital image from the modified latent vector. In response to user interaction to modify a digital image, for instance, the disclosed systems modify a latent vector extracted from the digital image to reflect the requested modification. The disclosed systems further use a latent vector stream renderer (as an intermediary device) to generate an image delta that indicates a difference between the digital image and the modified digital image. The disclosed systems then provide the image delta as part of a digital stream to a client device to quickly render the modified digital image.

20 Claims, 17 Drawing Sheets

(56) References Cited

OTHER PUBLICATIONS

McInnes, Leland et al.; "UMAP: Uniform Manifold Approximation and Projection for Dimension Reduction"; dated Feb. 9, 2018; https://arxiv.org/abs/1802.03426v1.

* cited by examiner

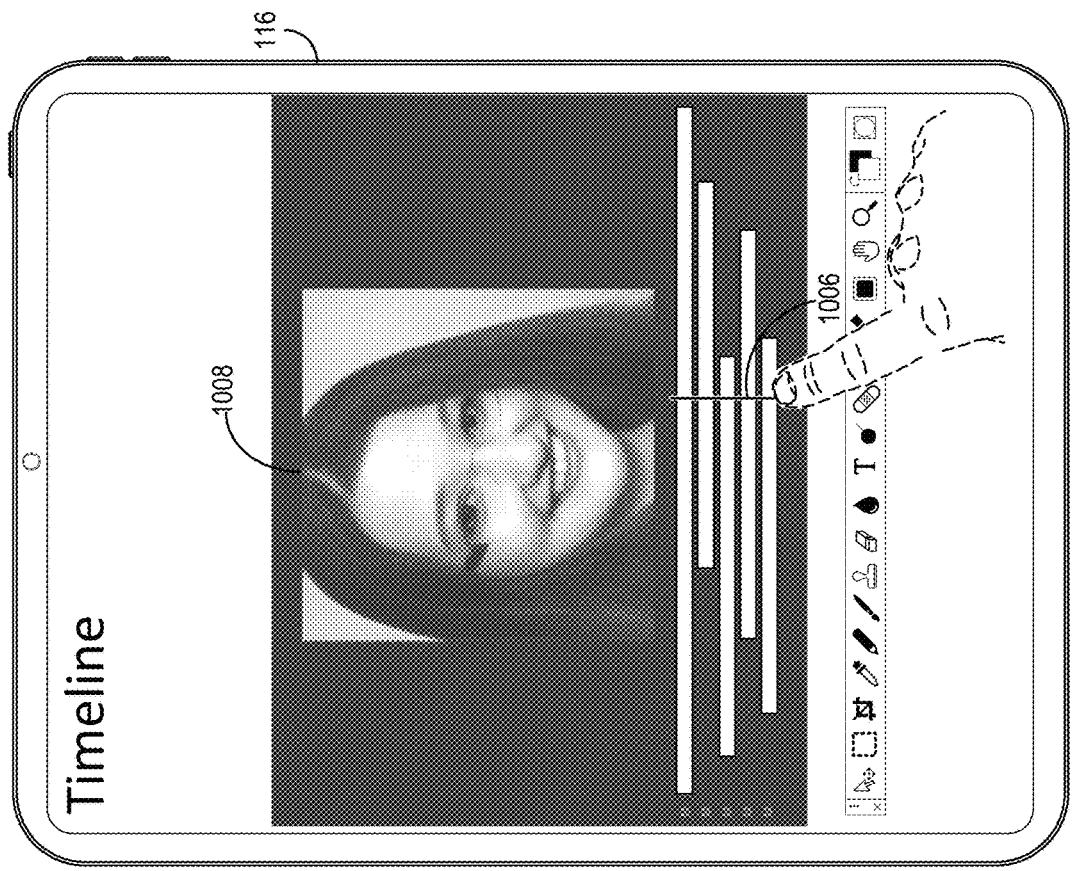
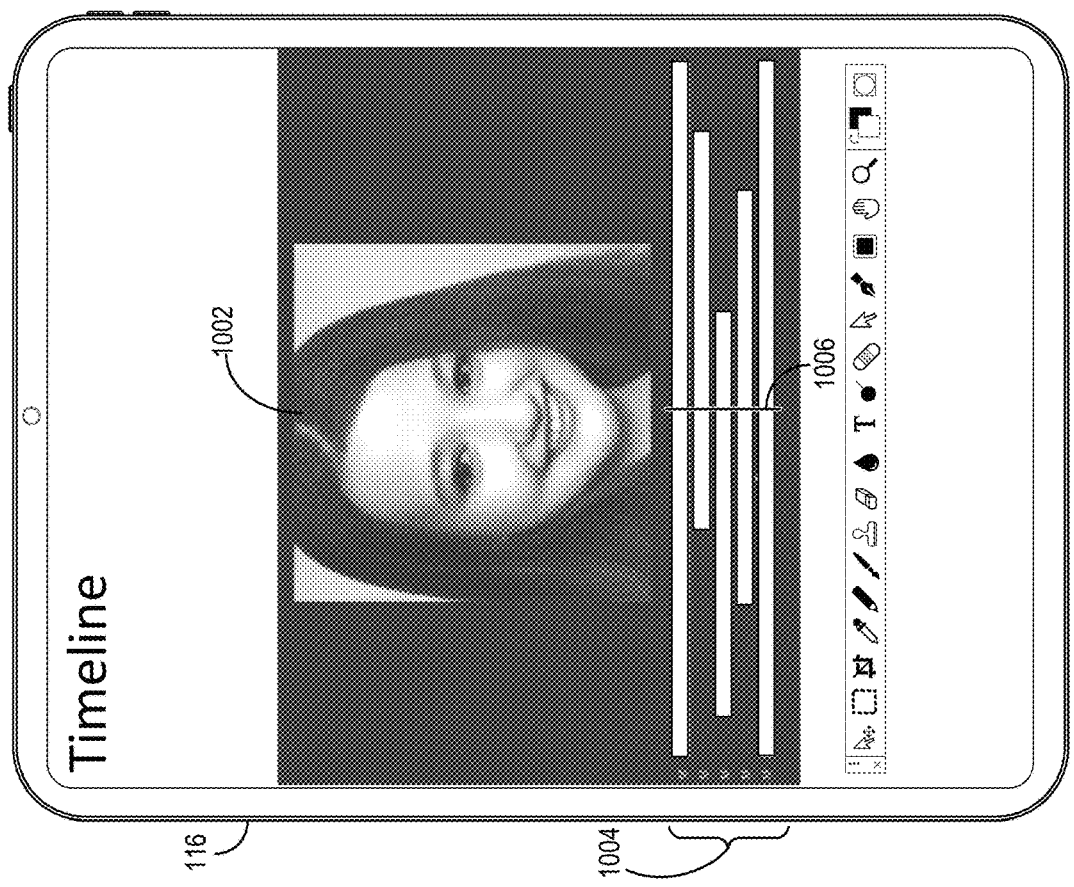
Fig. 10A
Fig. 10B

1400

```
┌─────────────────────────────────────────────────────────────────────┐
│  Extracting A Latent Image Vector From An Initial Digital Image 1402│
└─────────────────────────────────────────────────────────────────────┘
                                    │
                                    ▼
┌─────────────────────────────────────────────────────────────────────┐
│       Receiving An Indication To Modify The Initial Digital Image 1404│
└─────────────────────────────────────────────────────────────────────┘
                                    │
                                    ▼
┌─────────────────────────────────────────────────────────────────────┐
│              Determining An Image-Differential Metric 1406          │
└─────────────────────────────────────────────────────────────────────┘
                                    │
                                    ▼
┌─────────────────────────────────────────────────────────────────────┐
│  Providing The Image-Differential Metric For Rendering A Modified Digital │
│                              Image 1408                             │
└─────────────────────────────────────────────────────────────────────┘
```

*Fig. 14*

WEB-BASED DIGITAL IMAGE EDITING IN REAL TIME UTILIZING A LATENT VECTOR STREAM RENDERER AND AN IMAGE MODIFICATION NEURAL NETWORK

BACKGROUND

In recent years, computer engineers have developed software and hardware platforms for modifying digital images using various models, such as neural networks, including generative adversarial networks ("GANs"). Based on such developments, some conventional image editing systems can modify digital images by extracting features from digital images and combining the extracted features with those from other digital images. Other conventional systems can modify digital images by performing GAN-based operations to adjust certain features that correspond to specific GAN-based visual attributes (e.g., age, anger, surprise, or happiness). Despite these advances, however, many conventional image editing systems often require excess computing resources to modify digital images using GANs. Consequently, conventional systems often cannot modify images in real time using a GAN on certain computing devices and frequently limit such image editing or generation to devices with powerful processors.

As just suggested, conventional image editing systems often inefficiently consume computing resources when extracting features from (or modifying) digital images with a neural network. In particular, conventional systems sometimes waste processing time, processing power, and memory when modifying digital images utilizing a GAN or other neural network. For example, some conventional systems generate (and transmit for display) entirely new digital images for each editing operation, such that each new digital image results from the most recent editing operation. The computational cost of generating and transmitting a single image for a single edit—let alone edits for tens or hundreds of images in a single session—can require significant computer processing.

Due to their computational inefficiency for each successive edit operation, some conventional digital image editing systems modify digital images only at slow speeds when using a local processor to execute a neural network. Indeed, conventional systems that utilize local GANs to modify digital images on a particular computing device (e.g., mobile or simple laptop devices) are often too slow for real-time application. Unless the conventional system is running on a computer with a powerful graphical processing unit ("GPU"), modifying a digital image using a GAN takes a significant amount of time that eliminates the possibility of performing such modifications as part of interactive, on-the-fly image editing.

Due at least in part to their computationally intensive nature and their speed constraints, many conventional digital image editing systems also inflexibly limit image editing to particular types of image edits or other applications. Specifically, conventional systems often rigidly limit applications to particularly powerful computing devices because of the computational requirements of GAN-based or other neural-network-based image operations. Thus, conventional systems not only cannot perform real-time editing on many client devices with a neural network, but the computational expense of these systems also frequently prevents their application on less powerful devices (e.g., mobile devices).

As a further example of inefficiency, some conventional image editing systems provide inefficient graphical user interfaces that require excessive numbers of user interactions to access desired data and/or functionality. For example, to implement a GAN-based digital image modification, some conventional systems require multiple user interactions to manually select and edit particular portions (or attributes) of digital images. In some cases, processing such large numbers of user interactions wastes computing resources, such as processing power and memory that could otherwise be preserved with fewer user interactions.

SUMMARY

This disclosure describes one or more embodiments of systems, methods, and non-transitory computer readable media that solve one or more of the foregoing or other problems in the art. The disclosed systems can detect user interactions to edit a digital image from a client device and modify the digital image for the client device by using a web-based intermediary that modifies a latent vector of the digital image and uses an image modification neural network to generate a modified digital image from the modified latent vector. In response to user interaction to modify a digital image, for instance, the disclosed systems modify a latent vector extracted from the digital image to reflect the requested modification. Based on the modified latent vector, the disclosed systems generate a modified digital image utilizing an image modification neural network, such as a generative adversarial network ("GAN"). The disclosed systems further use a latent vector stream renderer (as an intermediary device) to generate an image delta, or a difference metric, that indicates a difference between the digital image and the modified digital image. The disclosed systems then provide the image delta as part of a digital stream to a client device to quickly render the modified digital image. In some embodiments, the disclosed systems further generate and provide efficient user image modification interfaces that require relatively few user interactions for performing neural-network-based operations for digital images, such as GAN-based operations.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIGS. 10A-10B illustrate image modification interfaces including a timeline tool in accordance with one or more embodiments;

FIG. 14 illustrates a flowchart of a series of acts for generating and providing an image-differential metric by comparing digital images associated with latent image vectors in accordance with one or more embodiments.

DETAILED DESCRIPTION

Figure 1:
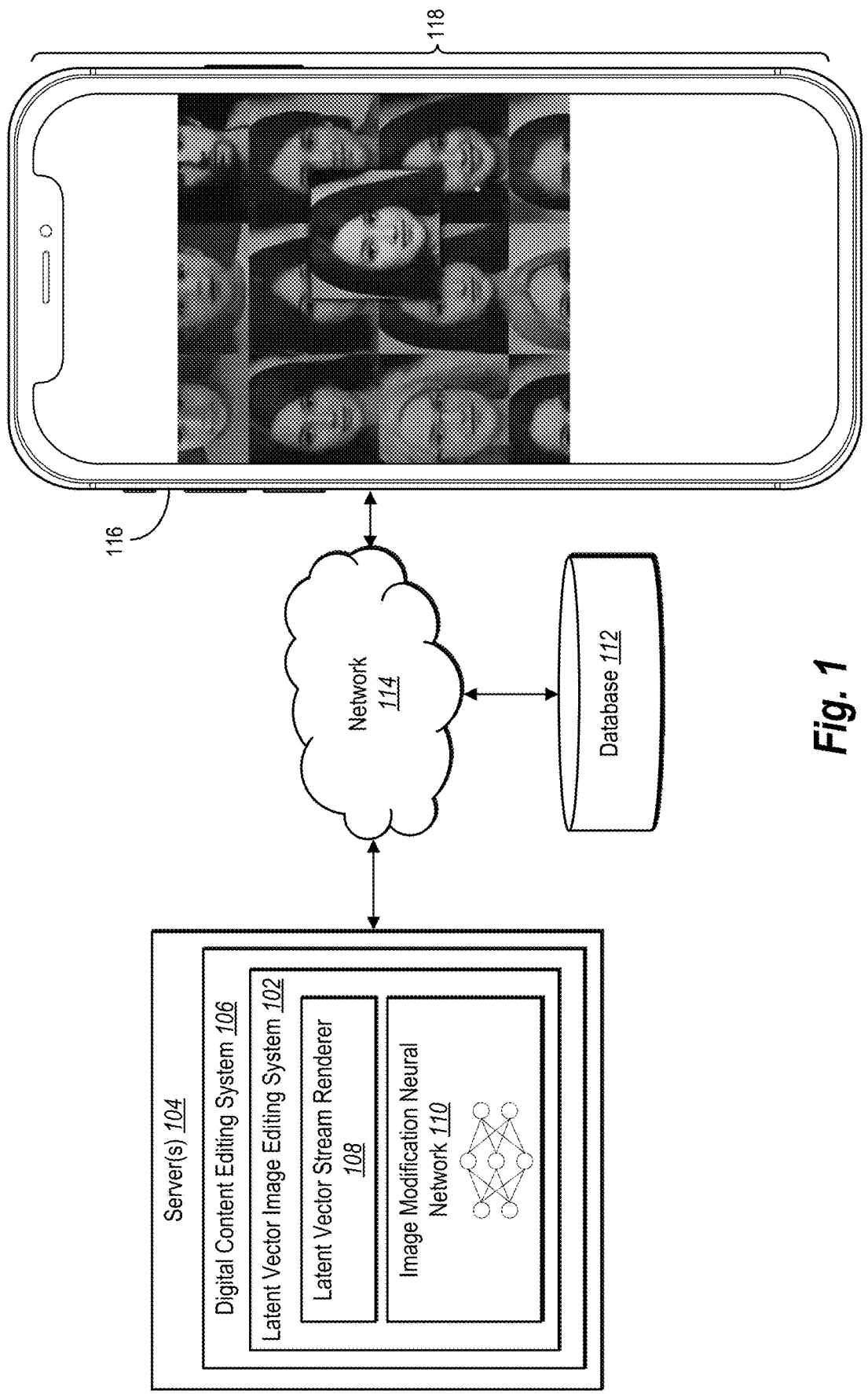
FIG. 1 illustrates an example system environment in which a latent vector image editing system operates in accordance with one or more embodiments.

This disclosure describes one or more embodiments of a latent vector image editing system that detects user interactions to edit a digital image on a client device and modifies the digital image for the client device by using a web-based intermediary to modify a latent vector of the digital image and uses an image modification neural network to generate a modified digital image from the modified latent vector. In particular, the latent vector image editing system receives an indication of a user interaction for modifying a digital image. Based on the user interaction, in some embodiments, the latent vector image editing system further determines an image-differential metric that reflects the modification. For instance, the latent vector image editing system utilizes a novel latent vector stream renderer to generate the image-differential metric by comparing the initial digital image with the digital image modified via the image modification neural network. In some cases, the latent vector image editing system provides the image-differential metric to the client device to cause the client device to render and display the modified digital image in real time (or near real time) relative to the user interaction, even in circumstances where the client device is a mobile device.

As suggested above, in one or more embodiments, the latent vector image editing system receives an indication of a user interaction to modify a digital image using a neural-network-based operation (e.g., a GAN-based operation). To facilitate such user interaction, the latent vector image editing system provides the digital image for display on a client device within an image modification interface. In some cases, the latent vector image editing system provides the digital image as part of a digital stream (e.g., as a frame in the digital video feed) that plays on the client device. In some embodiments, the digital stream appears within the image modification interface to be a still digital image. The latent vector image editing system receives an indication of a user interaction to modify the digital image from the image modification interface with a display of the digital image as part of the digital stream.

Based on the indication of the user interaction, in some embodiments, the latent vector image editing system generates a modified latent image vector for the digital image. For example, the latent vector image editing system utilizes an image modification neural network, such as a GAN, to extract latent features from a digital image and further modifies the latent image vector based on the user interaction. In some cases, the latent vector image editing system generates an initial latent image vector (e.g., before the user interaction to modify the digital image) for an initial digital image selected or uploaded by a client device and subsequently modifies the latent image vector to reflect user-selected modifications made to the digital image.

After modifying the latent image vector, in certain embodiments, the latent vector image editing system further generates a modified digital image that reflects the changes requested via the user interaction. For example, the latent vector image editing system utilizes the image modification neural network to generate the modified digital image from the modified latent image vector. In one or more embodiments, the latent vector image editing system further determines an image-differential metric between the initial digital image and the modified digital image. For example, the latent vector image editing system compares the modified digital image with the initial digital image to generate an image-differential metric that reflects changes to the digital image (or to the latent image vector) resulting from the user interaction.

Having generated the image-differential metric, in some cases, the latent vector image editing system provides the image-differential metric to the client device. For instance, the latent vector image editing system provides the image-differential metric to cause the client device to update the digital image and render the modified digital image for display. In one or more embodiments, the latent vector image editing system provides the image-differential metric as part of a digital stream that includes code or instructions to cause the client device to render changes to the digital stream. For example, the latent vector image editing system provides the image-differential metric as part of a digital stream to instruct the client device to render the modified digital image in place of the initial digital image (e.g., as a subsequent frame) to visually illustrate the change. Indeed, in certain embodiments, rather than regenerating and providing entirely new digital images for each modification made within the image modification interface, the latent vector image editing system determines and provides the image-differential metric to a client device to indicate a relatively small change, or delta, resulting from the modification.

To show either an initial digital image or modified digital images, in some embodiments, the latent vector image editing system provides an image modification interface for display on the client device. For example, the latent vector image editing system provides an image modification interface that includes the digital image (e.g., as part of a digital video feed) along with one or more selectable elements for performing neural-network-based operations to the digital image (e.g., GAN-based operations). In some cases, the image modification interface includes a grid of additional digital images selectable to modify the initial digital image by blending or mixing features associated with selected digital images from the grid together with those of the initial digital images. In other cases, the image modification interface includes slider elements selectable to adjust certain image features associated with the initial digital image. In still other cases, the image modification interface includes additional or alternative elements for performing neural-network-based operations. Additional detail regarding various embodiments of the image modification interface is provided below with reference to the figures.

As suggested above, the latent vector image editing system provides several technical advantages over conventional image editing systems. For example, in some embodiments, the latent vector image editing system improves computing efficiency over conventional systems. To elaborate, the latent vector image editing system can use less processing time, processing power, and memory than conventional systems to generate and provide neural-network-based modifications to digital images for display on a client device. While many conventional systems generate and provide entirely new digital images to visually represent each new neural-network-based operation performed, the latent vector image editing system preserves large amounts of computing resources on a client device by generating and providing an image-differential metric to the client device reflecting a neural-network-based modification—instead of locally modifying an image on the client device using a neural network, such as a GAN. Indeed, rather than consuming considerable local processing power to generate or regenerate entirely new digital images, the latent vector image editing system determines and provides image-differential metrics that instruct a client device to render modifications to a digital image by using much less processing power based on changes or deltas resulting from user interactions.

To illustrate such an improvement in computing efficiency, in some embodiments, the latent vector image editing system utilizes a distributed architecture that includes a latent vector stream renderer at one computing device and one or more neural networks (e.g., GANs) at another computing device—both of which are separate from a client device. The latent vector stream renderer stores latent vectors to pass back and forth from the neural networks and to facilitate determining image-differential metrics to update a digital stream provided to a client device. Thus, the latent vector image editing system conserves computing resources by determining and passing image-differential metrics to update digital images for each new operation. By contrast, many conventional systems run GANs or other neural networks on a local GPU and thus require significantly more local computing resources to generate and regenerate modified digital images from scratch for each new editing operation. Thus, as opposed to conventional systems that operate too slowly for real-time, interactive editing, the latent vector image editing system can perform image editing operations on-the-fly for interactive applications.

As a further example of improved efficiency, in some embodiments, the latent vector image editing system provide efficient graphical user interfaces that require fewer user interactions than those of conventional systems to access desired data and/or functionality. For example, as opposed to conventional systems that require many user interactions to manually select and edit portions of a digital image, the latent vector image editing system reduces the required user interactions by providing an image modification interface that includes a grid of digital images selectable to modify an initial digital image by mixing features using a neural-network-based operation. In some embodiments, the latent vector image editing system provides an image modification interface that includes a set of selectable slider elements for modifying various GAN-based image features of a digital image. The image modification interfaces provided by the latent vector image editing system improves efficiency by reducing user interactions and simplifying the process of modifying digital images.

As a result of the improved efficiency of the latent vector image editing system, embodiments of the latent vector image editing system also improve speed over conventional digital image editing systems. For example, by generating and proving an image-differential metric to update a digital image displayed on a client device, the latent vector image editing system not only reduces the computational requirements of providing modified digital images but further increases the speed of doing so as well. In some cases, unlike many conventional systems, the latent vector image editing system is fast enough for interactive, on-the-fly digital image editing by providing image-differential metrics reflecting neural-network-based (e.g., GAN-based) image modifications in real time with user interactions requesting the modifications.

Not only does its more efficient operation provide improved speed, but the latent vector image editing system further provides improved flexibility over conventional digital image editing systems. For example, in contrast to many conventional systems that are limited to operation on particularly powerful computing devices, the latent vector image editing system can facilitate neural-network-based digital image editing via less powerful computing devices with rudimentary or slow GPUs, such as mobile devices. Indeed, the latent vector image editing system generates and provide image-differential metrics that are smaller and easier to process (compared to the entire images used by conventional systems), thereby enabling mobile devices to render neural-network-based digital image modifications in an interactive, real time fashion.

As suggested by the foregoing discussion, this disclosure utilizes a variety of terms to describe features and benefits of the latent vector image editing system. Additional detail is hereafter provided regarding the meaning of these terms as used in this disclosure. In particular, the term the term "neural network" refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data.

Relatedly, the term "image modification neural network" refers to a neural network that extracts latent image vectors from digital images and/or generates digital images from latent image vectors. In particular, an image modification neural network extracts latent or hidden features from a digital image and encodes the features into a latent feature vector. In some cases, an image modification neural network generates or reconstructs a digital image from a latent image vector. In one or more embodiments, an image modification neural network takes the form of a generative adversarial neural network. For example, in some embodiments, the image modification neural network is the iGAN described by Jun-Yan Zhu, Philipp Krähenbühl, Eli Shechtman, and Alexei A. Efros in *Generative Visual Manipulation on the Natural Image Manifold*, European Conference on Computer Vision 597-613 (2016), which is incorporated herein by reference in its entirety. In other embodiments, the image modification neural network is a StyleGAN, StyleGAN2, RealnessGAN, ProGAN, or any other suitable generative neural network. In certain cases, the image modification neural network is a neural network other than a generative neural network, and takes the form of, for example, a PixelRNN or a PixelCNN.

As used herein, the term "generative adversarial neural network" (sometimes simply "GAN") refers to a neural network that is tuned or trained via an adversarial process to generate an output digital image from an input digital image. In some cases, a generative adversarial neural network includes multiple constituent neural networks such as an encoder neural network and a generator neural network. For example, an encoder neural network extracts latent code from a digital image. A generator neural network generates a modified digital image by combining extracted latent code (e.g., from the encoder neural network). A discriminator neural network, in competition with the generator neural network, analyzes a generated digital image from the generator neural network to determine whether the generated digital image is real (e.g., from a set of stored digital images) or fake (e.g., not from the set of stored digital images). The discriminator neural network also causes the latent vector image editing system to modify parameters of the encoder neural network and/or the generator neural network to eventually generate digital images that fool the discriminator neural network into indicating that a generated digital image is a real digital image.

As mentioned, the latent vector image editing system extracts a latent image vector from a digital image. As used herein, the term "latent image vector" refers to a vector of hidden or latent features that represent or indicate image features and/or unobservable attributes of a digital image. For example, a latent image vector includes a numerical encoding or representation of a digital image. In some embodiments, a latent image vector includes one or more vector directions. A "vector direction" refers to a direction of a latent image vector that encodes or indicates a particular image feature. For example, one vector direction corresponds to age while another vector direction corresponds to happiness of a face depicted within a digital image. Thus, modifying the latent image vector in either of the directions results in corresponding modifications to the neural-network-based image features (e.g., GAN-based image features) depicted by the digital image.

Relatedly, an "initial latent image vector" refers to a latent image vector extracted from, or otherwise corresponding to, an initial (e.g., un-modified) digital image. Conversely, a "modified latent image vector" refers to a latent image vector corresponding to a modified digital image. For example, a modified latent image vector includes one or more modified features resulting from a user interaction to perform a GAN-based operation to edit a digital image.

As mentioned, in some embodiments, the latent vector image editing system utilizes an image modification neural network to modify digital images or generate modified versions of a digital image. In some such cases, the image modification neural network constitutes a GAN performing GAN-based operations. As used herein, the term "GAN-based operation" refers to a digital image editing operation that utilizes one or more GANs to perform the requested modification. In particular, a GAN-based operation includes an operation to perform a "GAN-based modification" to edit or change one or more "GAN-based image features" of a digital image. Example GAN-based image features include, but are not limited to, a measure of happiness, a measure of surprise, a measure of age, a measure of anger, and a measure of baldness. Indeed, GAN-based image features are generally more complex and computationally intensive than more conventional digital image modifications, such as changing colors, cropping, and adjusting brightness. Additional GAN-based visual features are described below in relation to the figures.

In certain described embodiments, the latent vector image editing system determines an image-differential metric for a particular modification. As used herein, the term "image-differential metric" refers to a metric or an indication of a difference between a previous digital image and a subsequent or modified version of a digital image (e.g., after a modification). Indeed, in some cases, an image-differential metric includes indicates a change, or delta, between a previously rendered digital image and a modified digital image to be rendered. In some embodiments, an image-differential metric includes instructions or computer code (interpretable by a browser or another client application) to cause a client device to update a digital video feed by modifying a current digital image (or a current frame) with a modified version (of the current frame) by implementing a change included within the image-differential metric. For example, an image-differential metric indicates a change of a latent image vector in one vector direction or another to thereby adjust a particular GAN-based image feature.

In some embodiments, the latent vector image editing system provides an image-differential metric to a client device as part of a digital stream. As used herein, the term "digital stream" refers to a continuous or consecutive transmission and/or reception of one or more data objects (e.g., data packets) from one computing device to another computing device. In some cases, the latent vector image editing system provides a digital stream to a client device to keep digital images displayed on the client device up to date in real time relative to user interactions requesting modifications. For example, a digital stream can include data for one or more digital images of a digital video feed. A digital stream can also, or alternatively, include an image-differential metric that indicates changes to a digital image or a digital video feed. In some cases, the latent vector image editing system utilizes a latent vector stream renderer to generate and provide the digital stream to the client device.

Additional detail regarding the latent vector image editing system will now be provided with reference to the figures. For example, FIG. 1 illustrates a schematic diagram of an example system environment for implementing a latent vector image editing system 102 in accordance with one or more embodiments. An overview of the latent vector image editing system 102 is described in relation to FIG. 1. Thereafter, a more detailed description of the components and processes of the latent vector image editing system 102 is provided in relation to the subsequent figures.

As shown, the environment includes server(s) 104, a client device 116, a database 112, and a network 114. Each of the components of the environment communicate via the network 114, and the network 114 is any suitable network over which computing devices communicate. Example networks are discussed in more detail below in relation to FIG. 15.

As mentioned, the environment includes a client device 116. The client device 116 is one of a variety of computing devices, including a smartphone, a tablet, a smart television, a desktop computer, a laptop computer, a virtual reality device, an augmented reality device, or another computing device as described in relation to FIG. 15. Indeed, unlike many conventional systems, the latent vector image editing system 102 is capable of operation on a mobile device for interactive, real-time GAN-based digital image editing. Although FIG. 1 illustrates a single instance of the client device 116, in some embodiments, the environment includes multiple different client devices, each associated with a different user (e.g., a digital image editor). The client device 116 communicates with the server(s) 104 via the network 114. For example, the client device 116 receives user input from a user interacting with the client device 116 (e.g., via the client application 118) to, for instance, edit, modify, or generate digital content, such as a digital image. Thus, the latent vector image editing system 102 on the server(s) 104 receives information or instructions to generate a modified digital image.

As shown in FIG. 1, the client device 116 includes a client application 118. In particular, the client application 118 is a web application, a native application installed on the client device 116 (e.g., a mobile application, a desktop application, etc.), or a cloud-based application where all or part of the functionality is performed by the server(s) 104. The client application 118 presents or displays information to a user, including an image modification interface. For example, a user interacts with the client application 118 to provide user input to select and/or modify one or more digital images.

As illustrated in FIG. 1, the environment includes the server(s) 104. The server(s) 104 generates, tracks, stores, processes, receives, and transmits electronic data, such as digital image modifications and indications of user interactions. For example, the server(s) 104 receives data from the client device 116 in the form of an indication of a user interaction to modify a digital image. In addition, the server(s) 104 transmits data to the client device 116 to provide an image-differential metric to cause the client device 116 to display or present a modified digital image. Indeed, the server(s) 104 communicates with the client device 116 to transmit and/or receive data via the network 114. In some embodiments, the server(s) 104 comprises a distributed server where the server(s) 104 includes a number of server devices distributed across the network 114 and located in different physical locations. The server(s) 104 comprises a content server, an application server, a communication server, a web-hosting server, a multidimensional server, or a machine learning server.

As further shown in FIG. 1, the server(s) 104 also includes the latent vector image editing system 102 as part of a digital content editing system 106. The digital content editing system 106 communicates with the client device 116 to perform various functions associated with the client application 118, such as storing and managing a repository of digital images, modifying digital images, and providing modified digital images for display. For example, the latent vector image editing system 102 communicates with the database 112 to access a repository of digital images and/or access or store latent image vectors within the database 112. Indeed, as further shown in FIG. 1, the environment includes a database 112. In particular, the database 112 stores information such as a repository digital images as well as latent image vectors generated from the digital images.

In addition, the latent vector image editing system 102 includes a latent vector stream renderer 108. In particular, the latent vector stream renderer 108 communicates with the client device 116 and an image modification neural network 110. For example, the latent vector stream renderer 108 receives indications of user interactions to modify digital images. Based on the indications, the latent vector stream renderer 108 further generates modified latent image vectors and provides the modified latent image vectors to the image modification neural network 110. Additionally, the latent vector stream renderer 108 receives modified digital images from the image modification neural network 110 and determines an image-differential metric by comparing the initial digital image and the modified digital image. The latent vector stream renderer 108 further provides the image-differential metric to the client device 116 (e.g., as part of a digital stream) to cause the client device 116 to render the modified digital image.

As just mentioned, and as illustrated in FIG. 1, the latent vector image editing system 102 also includes the image modification neural network 110. In particular, the image modification neural network 110 receives and/or provides digital images and/or latent image vectors from the latent vector stream renderer 108. For example, the image modification neural network 110 extracts a latent image vector from a digital image received from the latent vector stream renderer 108. In addition, the image modification neural network 110 generates a modified digital image from a modified latent image vector received from the latent vector stream renderer 108. In some embodiments, the image modification neural network 110 is a GAN that includes an encoder neural network and a generator neural network.

Although FIG. 1 illustrates a particular arrangement of the environment, in some embodiments, the environment has a different arrangement of components and/or may have a different number or set of components altogether. For instance, in some embodiments, the latent vector image editing system 102 is implemented by (e.g., located entirely or in part on) the client device 116 and/or a third-party device. In some embodiments, the latent vector stream renderer 108 and the image modification neural network 110 are located on the same server(s) 104, while in other embodiments, the latent vector stream renderer 108 and the image modification neural network 110 are located remotely from one another, on different server devices (though with a certain geographic distance to maintain communication speed). In addition, in one or more embodiments, the client device 116 communicates directly with the latent vector image editing system 102, bypassing the network 114. Further, in some embodiments, the database 112 is located external to the server(s) 104 (e.g., in communication via the network 114) or located on the server(s) 104 and/or on the client device 116.

Figure 2:
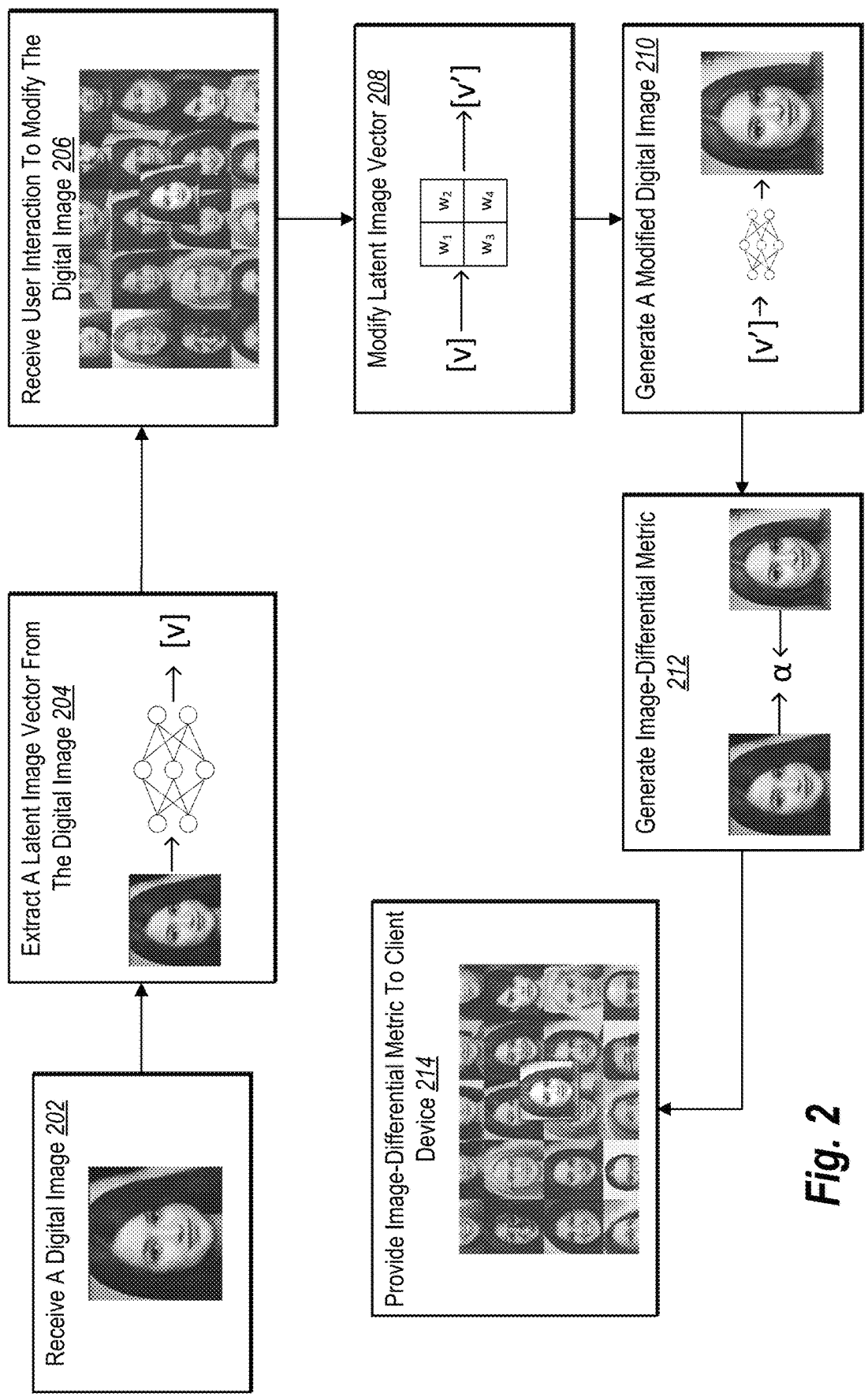
FIG. 2 illustrates an overview of modifying a digital image using a latent-vector approach to determine an image-differential metric in accordance with one or more embodiments.

As mentioned, in one or more embodiments, the latent vector image editing system 102 generates and provides modified digital images for display utilizing latent vector approach that facilitates real-time implementation of neural-network-based modifications (e.g., GAN-based modifications). In particular, the latent vector image editing system 102 determines an image-differential metric that indicates, and causes a client device to present, a change from an initial digital image to a modified digital image. FIG. 2 illustrates an overview of determining an image-differential metric for presenting a digital image modification (e.g., a GAN-based modification) on a client device in real time in accordance with one or more embodiments. Additional detail regarding the various acts of FIG. 2 is provided in relation to subsequent figures.

As illustrated in FIG. 2, the latent vector image editing system 102 performs an act 202 to receive a digital image. In particular, the latent vector image editing system 102 receives a digital image from the client device 116 in the form of a selected digital image, a captured digital image, or an uploaded digital image. In some embodiments, the latent vector image editing system 102 identifies or accesses a digital image from a repository of stored digital images (e.g., within the database 112). For instance, the latent vector image editing system 102 receives an indication of a user selection of a particular digital image via the client device 116.

After receiving the digital image, the latent vector image editing system 102 performs an act 204 to extract a latent image vector from the digital image. More specifically, the latent vector image editing system 102 utilizes an image modification neural network (e.g., the image modification neural network 110) to extract a latent image vector that includes encoded features of the digital image. As shown, the latent vector image editing system 102 extracts a latent image vector represented as [v].

As further illustrated in FIG. 2, the latent vector image editing system 102 performs an act 206 to receive a user interaction to modify the digital image. In particular, the latent vector image editing system 102 receives an indication from the client device 116 of a user interaction to perform a GAN-based operation to edit or modify the digital image. As shown in FIG. 2, for instance, the latent vector image editing system 102 receives an indication of a user interaction to slide the initial digital image over one or more other digital image within a grid underlying the digital image. In some embodiments, the indication includes information reflecting which digital images are under the initial digital image (and in what proportions) for mixing features of the initial digital image with those of the underlying digital images.

As depicted in subsequent figures and described further below, in some embodiments, the latent vector image editing system 102 receives indications of different user interactions. For example, in some cases, the latent vector image editing system 102 provides one or more slider tools within an image modification interface that are selectable for adjusting image features with slider elements. As another example, the latent vector image editing system 102 provides a timeline tool that includes a slider bar selectable to slide across multiple elements at once for simultaneous modification of multiple image features. As yet another example, the latent vector image editing system 102 provides a collage tool for selecting portions of additional digital images to blend or combine with an initial digital image (e.g., by combining features). As still another example, the latent vector image editing system 102 provides a sketch tool for adding different strokes to an initial digital image via a digital brush or applicator, whereupon the latent vector image editing system 102 modifies the additional digital image according to the added strokes.

As further shown in FIG. 2, the latent vector image editing system 102 performs an act 208 to modify the latent image vector. More specifically, the latent vector image editing system 102 modifies or adjusts the extracted latent image vector from the initial digital image based on the user interaction. For example, the latent vector image editing system 102 determines, or receives an indication of, a vector direction of the latent image vector to modify based on the user interaction. In some embodiments, the vector direction corresponds to a particular image feature (e.g., GAN-based image feature) indicated by the user interaction. In these or other embodiments, the latent vector image editing system 102 modifies the latent image vector by combining (e.g., blending, mixing, concatenating, adding, and/or multiplying) one or more portions of the initial latent image vector with one or more portions of additional latent image vectors (e.g., corresponding to additional digital images).

For example, the latent vector image editing system 102 determines, or receives an indication of, one or more digital images underlying the initial digital image within a grid of digital images of an image modification interface. In addition, the latent vector image editing system 102 modifies the latent image vector by combining features of the initial digital image with those of the underlying digital images in the grid.

In some cases, the latent vector image editing system 102 determines, or receives an indication of, respective proportions or amounts of overlap of the initial digital image over the one or more underlying digital images. Based on their respective overlapping amounts, the latent vector image editing system 102 weights the features of the underlying digital images in combining them with the initial latent image vector to generate a modified latent image vector. As shown in FIG. 2, for instance, the latent vector image editing system 102 weights the features of the digital images overlapped by the initial digital image with weights $w_1$, $w_2$, $w_3$, and $w_4$. The latent vector image editing system 102 thus generates the modified latent image vector [v'].

In some embodiments, the latent vector image editing system 102 determines additional or alternative modifications to the initial latent image vector. For example, the latent vector image editing system 102 determines to modify the initial latent image vector in a particular vector direction indicated by the user interaction to modify the digital image. In some cases, the latent vector image editing system 102 modifies the initial latent image vector in vector direction corresponding to a particular image feature (e.g., GAN-based image feature). For instance, the latent vector image editing system 102 receives a user interaction to increase a measure of happiness, and the latent vector image editing system 102 adds to, or multiplies, features of the initial latent image vector in a vector direction corresponding to adjusting a smile (while maintaining other features of the latent image vector the same). Additional detail regarding the various user interactions and corresponding changes to latent image vectors is provided below with reference to subsequent figures.

As further illustrated in FIG. 2, the latent vector image editing system 102 performs an act 210 to generate a modified digital image. In particular, the latent vector image editing system 102 generates a modified digital image utilizing an image modification neural network (e.g., the image modification neural network 110). For example, the latent vector image editing system 102 inputs the modified latent image vector ([v']) into the image modification neural network 110, whereupon the image modification neural network 110 generates a modified digital image. As shown in FIG. 2, the latent vector image editing system 102 generates a modified digital image from the modified latent image vector that is modified to reflect sliding the initial digital image over the four underlying digital images. Indeed, the modified digital image depicted in FIG. 2 includes a (proportional) combination of features from the initial digital image as well as features from the four digital images overlapped by the initial digital image.

As also illustrated in FIG. 2, the latent vector image editing system 102 performs an act 212 to generate an image-differential metric. More specifically, the latent vector image editing system 102 generates an image-differential metric by comparing the initial digital image (e.g., received in the act 202) with the modified digital image (e.g., generated in the act 210). In some embodiments, the latent vector image editing system 102 compares the initial digital image by comparing respective latent vectors associated with the images (e.g., by subtracting one vector from another).

By comparing the digital images, the latent vector image editing system 102 determines a difference a between the initial digital image and the modified digital image. For example, the latent vector image editing system 102 determines a vector difference or a pixel difference. In any event, the image-differential metric includes information indicating the difference in appearance between the initial digital image and the modified digital image. In some embodiments, the image-differential metric includes only information for a difference between digital images, such as a difference in latent image vectors or corresponding pixels. In these or other embodiments, the image-differential metric does not include all of the information for an entirely new digital image or an entirely new digital video feed.

Additionally, the latent vector image editing system 102 performs an act 214 to provide the image-differential metric to the client device 116. In particular, the latent vector image editing system 102 provides the image-differential metric for rendering the modified digital image for display on the client device 116. Thus, the latent vector image editing system 102 causes the client device 116 to change from displaying the initial digital image to displaying the modified digital image.

In some cases, the latent vector image editing system 102 causes the client device 116 to update a digital video feed from a previous frame depicting the initial digital image to a subsequent frame depicting the modified digital image. Indeed, the image-differential metric can include information to cause the client device 116 to render the update by modifying the appearance of the initial digital image utilizing the image-differential metric (e.g., without streaming or rendering all of the information an entirely new digital image). As shown in FIG. 2, providing the image-differential metric causes the client device 116 to change the appearance of the initial digital image to that of the modified digital image.

Although FIG. 2 (along with the subsequent figures) illustrates generating and modifying digital images in a particular domain (e.g., faces), this is merely exemplary. Indeed, the latent vector image editing system 102 is applicable in other domains as well. For example, the latent vector image editing system 102 can modify and provide for display digital images depicted a variety of subject matter, including cars, buildings, people, landscapes, animals, furniture, or food. The principles, methods, and techniques of the latent vector image editing system 102 described herein apply across any domain or subject matter of digital images.

Figure 3A:
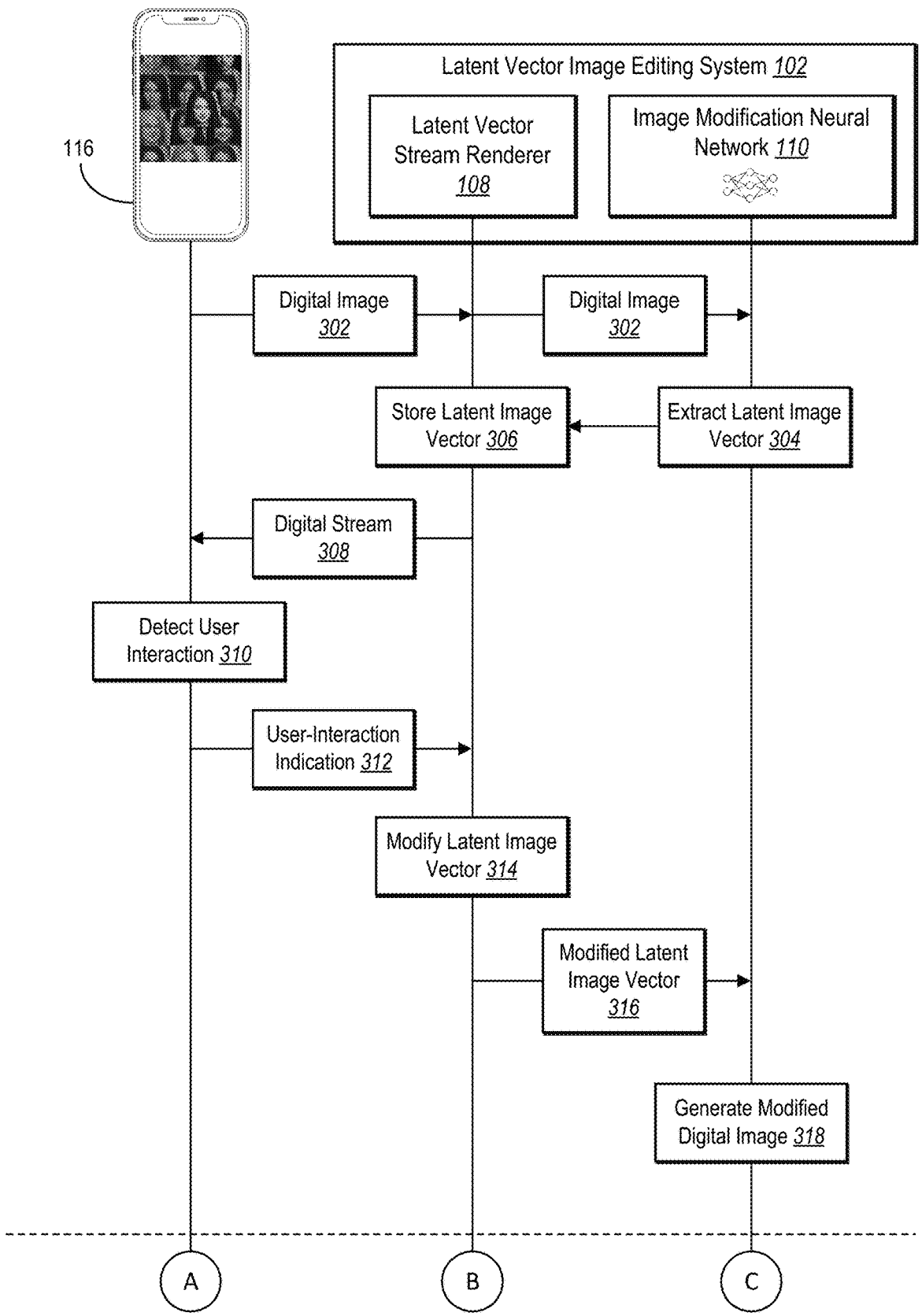
FIGS. 3A-3C illustrates a wireline diagram of various acts performed by a client device, a latent vector stream renderer, and an image modification neural network in accordance with one or more embodiments.
Figure 3B:
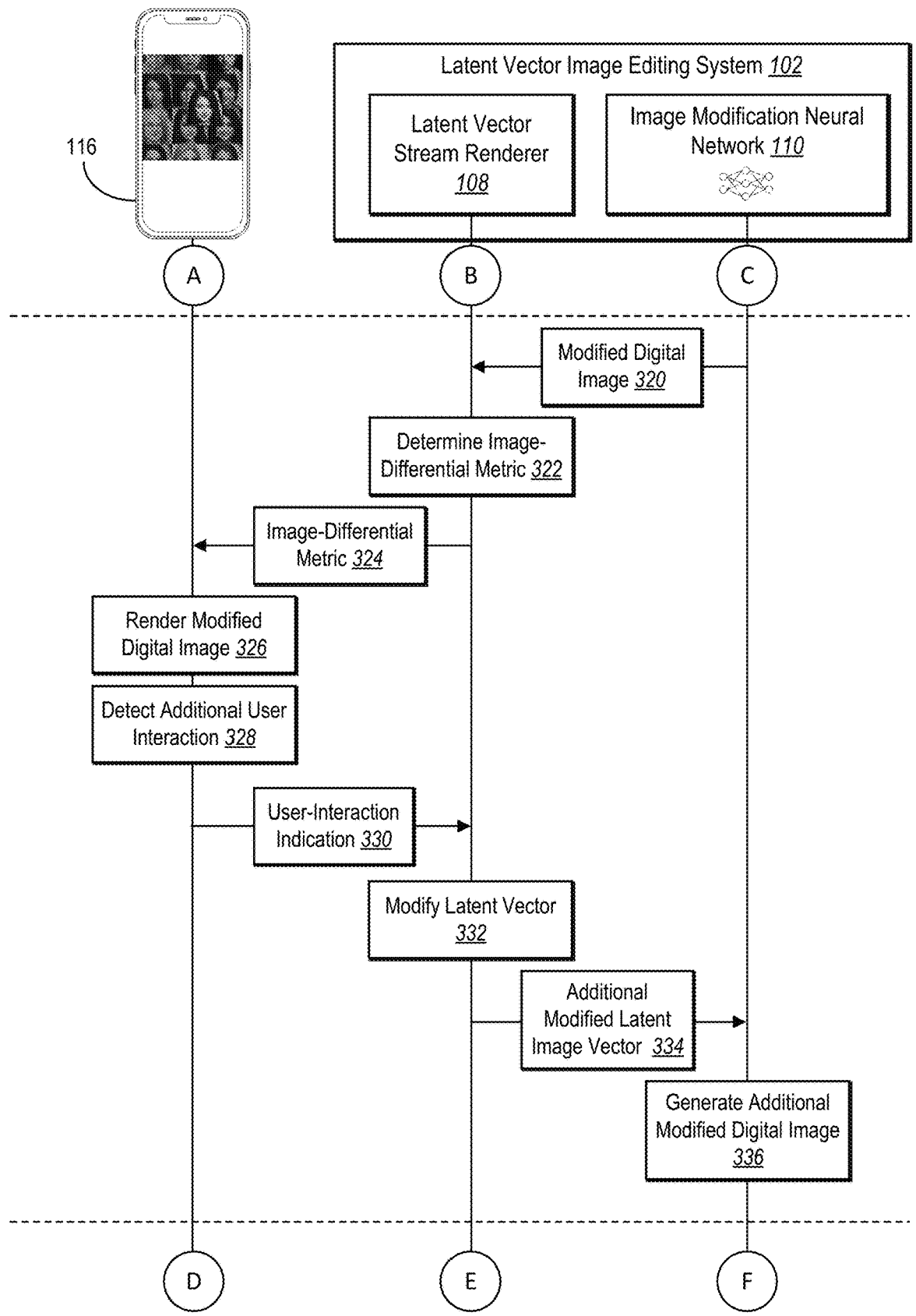
Figure 3C:
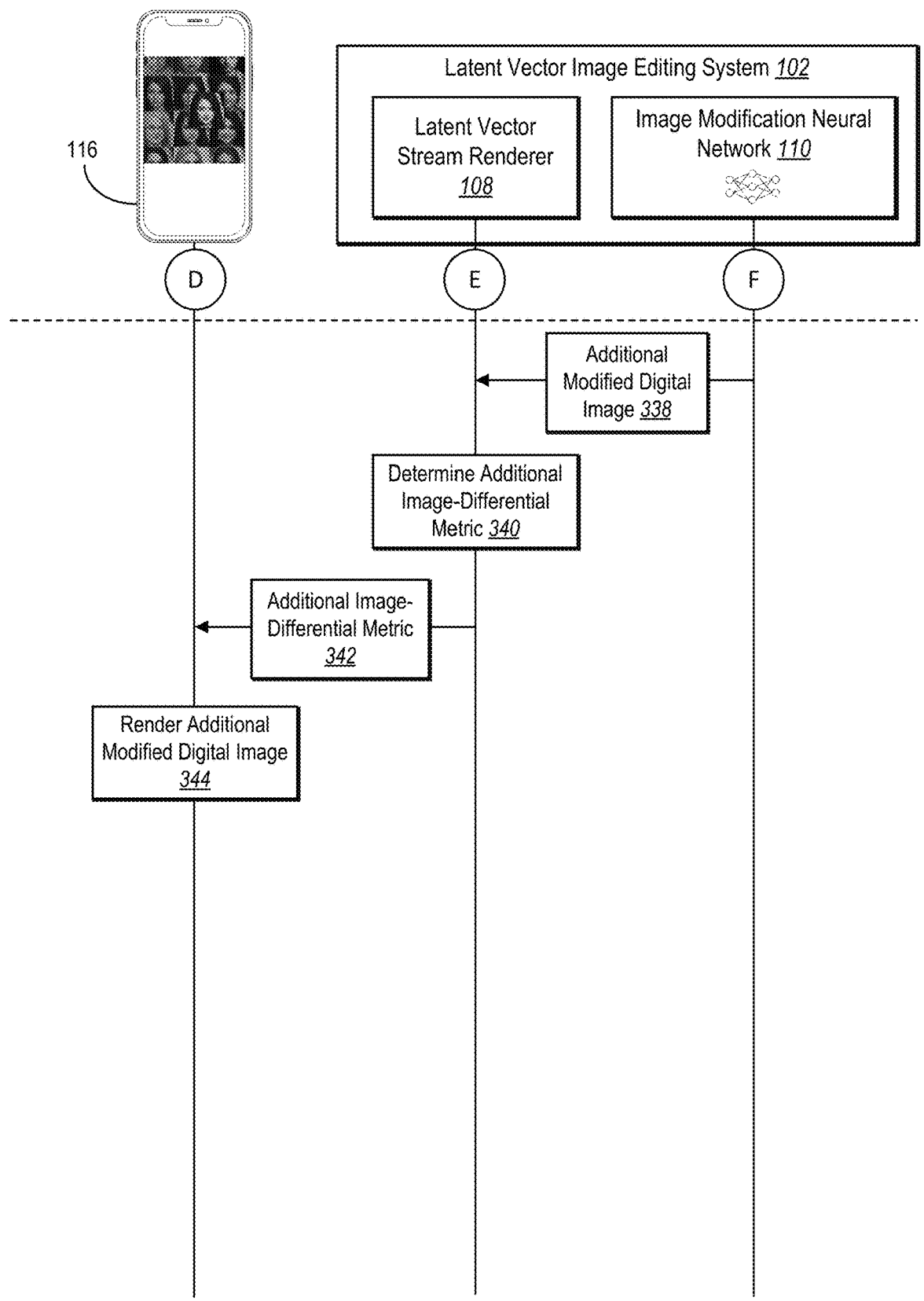

As suggested above, in one or more embodiments, the latent vector image editing system 102 utilizes a multi-faceted architecture of computing devices at different network locations (and/or different physical/geographical locations) working together to provide real-time digital image modifications to a client device. In particular, in some cases, the latent vector image editing system 102 utilizes a latent vector stream renderer 108 and the image modification neural network 110 located at the same server or at different servers across a network, each performing different acts of the latent vector image editing system 102. FIGS. 3A-3C illustrate an example diagram depicting various acts performed by the latent vector stream renderer 108, the image modification neural network 110, and the client device 116 in accordance with one or more embodiments.

As illustrated in FIG. 3A, the client device 116 provides data for (or an indication of) a digital image 302 to the latent vector stream renderer 108. In particular, the client device 116 captures, uploads, or selects the digital image 302. In addition, the client device 116 further provides the digital image 302, or the indication of the digital image 302, to the latent vector stream renderer 108. In turn, the latent vector stream renderer 108 provides the digital image 302 to the image modification neural network 110, whereupon the image modification neural network 110 performs an act 304 to extract a latent image vector from the digital image 302. For instance, as described above, the image modification neural network 110 extracts or encodes features corresponding to visible and unobservable traits of the digital image 302 into the latent image vector.

As further illustrated in FIG. 3A, the latent vector image editing system 102 passes or sends the extracted latent image vector from the image modification neural network 110 to the latent vector stream renderer 108. In one or more embodiments, the latent vector stream renderer 108 performs an act 306 to store the latent image vector within the database 112. Indeed, the latent vector image editing system 102 stores latent image vectors for later use. In some cases, the latent vector image editing system 102 extracts and stores latent image vectors for a repository of digital images (e.g., a repository associated with the digital content editing system 106).

In addition to storing latent image vectors, the latent vector stream renderer 108 provides a digital stream 308 to the client device 116. More specifically, the latent vector stream renderer 108 provides a digital stream 308 that includes information for rendering the digital image 302 for display within an image modification interface on the client device 116. In some cases, the digital stream 308 includes a digital video feed of the digital image 302. Thus, the client device 116 presents or displays the digital image 302 (e.g., within a digital video feed) with an image modification interface.

As shown further shown in FIG. 3A, the client device 116 also performs an act 310 to detect a user interaction. In particular, the client device 116 detects or receives user input within the image modification interface to modify or edit the digital image 302. For instance, the client device 116 receives a user interaction to perform a GAN-based operation to modify the digital image 302.

In response to the user interaction, the client device 116 provides a user-interaction indication 312 to the latent vector stream renderer 108. Indeed, the client device 116 provides an indication of the user interaction to modify the digital image. In some cases, the user-interaction indication 312 includes a request to, or information indicating a command to, modify one or more GAN-based image features of the digital image 302 (e.g., via a GAN-based operation).

In response to receiving the user-interaction indication 312, the latent vector stream renderer 108 performs an act 314 to modify the latent image vector. More particularly, the latent vector stream renderer 108 modifies the latent image vector for the digital image 302 extracted by the image modification neural network 110 and stored within the database 112. Indeed, the latent vector stream renderer 108 accesses the latent image vector from the database 112 and modifies the latent image vector using one or more modification operations. Such modification operations include adding to, or multiplying, a portion of the latent image vector corresponding to a particular vector direction and/or combining features of the latent image vector with features of one or more additional latent image vectors.

In some embodiments, the latent vector stream renderer 108 includes logic that progressive projects data for modified digital images while concurrently manipulating latent image vectors. To elaborate, the latent vector stream renderer 108 simultaneously modifies a latent image vector while communicating with the image modification neural network 110 to extract a latent image vector. In some cases, extracting a latent image vector from a digital image takes around 10-12 seconds for 100 iterations. However, rather than requiring the encoding process to complete for each digital image modification before applying the corresponding transformation and allowing a user to further manipulate the digital image 302, the latent vector stream renderer 108 can concurrently modify a latent image vector without needing to wait for the process of extracting a new latent image vector to complete. Thus, the latent vector stream renderer 108 enables user interaction via the client device 116 and concurrently modifies latent image vectors based on the user interaction, even while the image modification neural network 110 is still extracting a latent image vector. Additional detail regarding the modification operations for modifying the latent image vector is provided below with reference to subsequent figures.

As further illustrated in FIG. 3A, the latent vector image editing system 102 passes or sends the modified latent image vector 316 from the latent vector stream renderer 108 to the image modification neural network 110. In turn, the image modification neural network 110 performs an act 318 to generate a modified digital image. To elaborate, the image modification neural network 110 generates a modified digital image from the modified latent image vector 316. Indeed, the image modification neural network 110 processes the modified latent image vector 316 to generate a modified digital image by performing a GAN-based operation that results in modifications to one or more GAN-based image features of the digital image 302.

As continued in FIG. 3B, the latent vector image editing system 102 passes or sends the modified digital image 320 from the image modification neural network 110 to the latent vector stream renderer 108. Based on the modified digital image 320, the latent vector stream renderer 108 performs an act 322 to determine an image-differential metric. More particularly, the latent vector stream renderer 108 compares the modified digital image 320 with the digital image 302. For example, the latent vector stream renderer 108 determines a difference between pixels of the modified digital image 320 and pixels of the digital image 302. In some embodiments, the latent vector stream renderer 108 compares latent image vectors to determine a difference between the modified latent image vector 316 and the latent image vector extracted in the act 304. Thus, the latent vector stream renderer 108 generates an image-differential metric 324 that includes instructions or information for rendering a change to the digital image 302 initially displayed on the client device 116.

As further shown in FIG. 3B, the latent vector stream renderer 108 provides the image-differential metric 324 to the client device 116. By providing the image-differential metric 324, the latent vector stream renderer 108 causes the client device 116 to display or render the modified digital image 320. In particular, the image-differential metric 324 includes instructions to cause the client device 116 to modify the presentation of the digital image 302 by changing the pixels to resemble the appearance of the modified digital image 320. In some cases, the latent vector stream renderer 108 provides the image-differential metric 324 as part of a digital stream. For instance, the latent vector stream renderer 108 (constantly or continuously) maintains the same digital stream 308 provided to the client device 116 and updates the digital stream 308 with new information based on user interactions to modify digital images. For example, the latent vector stream renderer 108 provides the image-differential metric 324 within the digital stream 308 to thereby cause the client device 116 to update the presentation of the digital image 302 to show the modified digital image 320.

After receiving the image-differential metric 324, the client device 116 performs an act 326 to render a modified digital image. In particular, the client device 116 receives the image-differential metric 324 and renders the modified digital image 320 in place of the digital image 302. For example, the client device 116 interprets the instructions of the image-differential metric 324 that indicate how to modify the presentation of the digital image 302 to transform the presentation of the digital image 302 into a presentation of the modified digital image 320.

As illustrated in FIG. 3B, the client device 116 further performs an act 328 to detect an additional user interaction. In particular, the client device 116 detects or receives a user interaction to further modify the modified digital image 320. In response to the user interaction, the client device 116 provides a user-interaction indication 330 to the latent vector stream renderer 108. Indeed, in some embodiments, the client device 116 provides an indication of the user interaction requesting to further modify the modified digital image 320 (e.g., by performing a GAN-based operation).

As further shown in FIG. 3B, in turn, the latent vector stream renderer 108 performs an act 332 to further modify the latent image vector. In particular, the latent vector stream renderer 108 modifies the modified latent image vector 316 based on the user interaction. For example, the latent vector stream renderer 108 modifies the vector to combine features with one or more other latent image vectors and/or to adjust a vector direction corresponding to a particular image feature (e.g., GAN-based image feature).

After further modifying the latent image vector, the latent vector image editing system 102 passes or sends the additional modified latent image vector 334 from the latent vector stream renderer 108 to the image modification neural network 110. In response, the image modification neural network 110 performs an act 336 to generate an additional modified digital image. Specifically, the image modification neural network 110 generates the additional modified digital image from the additional modified latent image vector 334.

As continued in FIG. 3C, the latent vector image editing system 102 passes or sends the additional modified digital image 338 to the latent vector stream renderer 108. Similar to the above discussion, the latent vector stream renderer 108 performs an act 340 to determine an additional image-differential metric. Indeed, the latent vector stream renderer 108 compares the additional modified digital image 338 with the modified digital image 320. In some embodiments, the latent vector stream renderer 108 determines differences in appearance between the additional modified digital image 338 and the modified digital image 320 and encodes the differences in an additional image-differential metric.

As further shown in FIG. 3C, in some embodiments, the latent vector stream renderer 108 further provides the additional image-differential metric 342 to the client device 116. For example, the latent vector stream renderer 108 provides the additional image-differential metric 342 as part of the digital stream 308 (e.g., continuously or constantly provided to the client device 116). Indeed, the latent vector stream renderer 108 modifies the digital stream 308 to include the additional image-differential metric 342 to thereby cause the client device 116 to update a digital video feed from displaying the modified digital image 320 to displaying the additional modified digital image 338. As shown in FIG. 3C, the client device 116 performs an act 344 to render the additional modified digital image 338. As mentioned, the client device 116 updates a digital video feed by modifying a presentation of the modified digital image 320 to present the additional modified digital image 338.

The client device 116, the latent vector stream renderer 108, and the image modification neural network 110 can repeat any or all of the acts described in relation to FIGS. 3A-3C in a loop. For example, based on new user interactions to continually modify the digital image, the latent vector stream renderer 108 receives new indications and generates new modified latent image vectors. The image modification neural network 110 also generates new modified digital images for display on the client device 116. Thus, the acts of FIGS. 3A-3C can repeat in a cycle until user interaction ceases.

Although FIGS. 3A-3C illustrate a particular sequence of the described acts, additional or alternative sequences are possible. For example, in one or more embodiments, the latent vector stream renderer 108 provides the digital stream 308 to the client device 116 before (or simultaneously with) providing the digital image 302 to the image modification neural network 110 for extracting a latent image vector. As another example, the latent vector stream renderer 108 performs multiple acts to modify a latent image vector in response to several user interactions for modifying a digital image while the image modification neural network 110 is concurrently performing the act to extract a latent image vector from the digital image. In some cases, the latent vector image editing system 102 repeats the acts illustrated in FIGS. 3A-3C in the same or a different order to continuously edit a digital image based on user interaction requesting GAN-based modifications.

Figure 4:
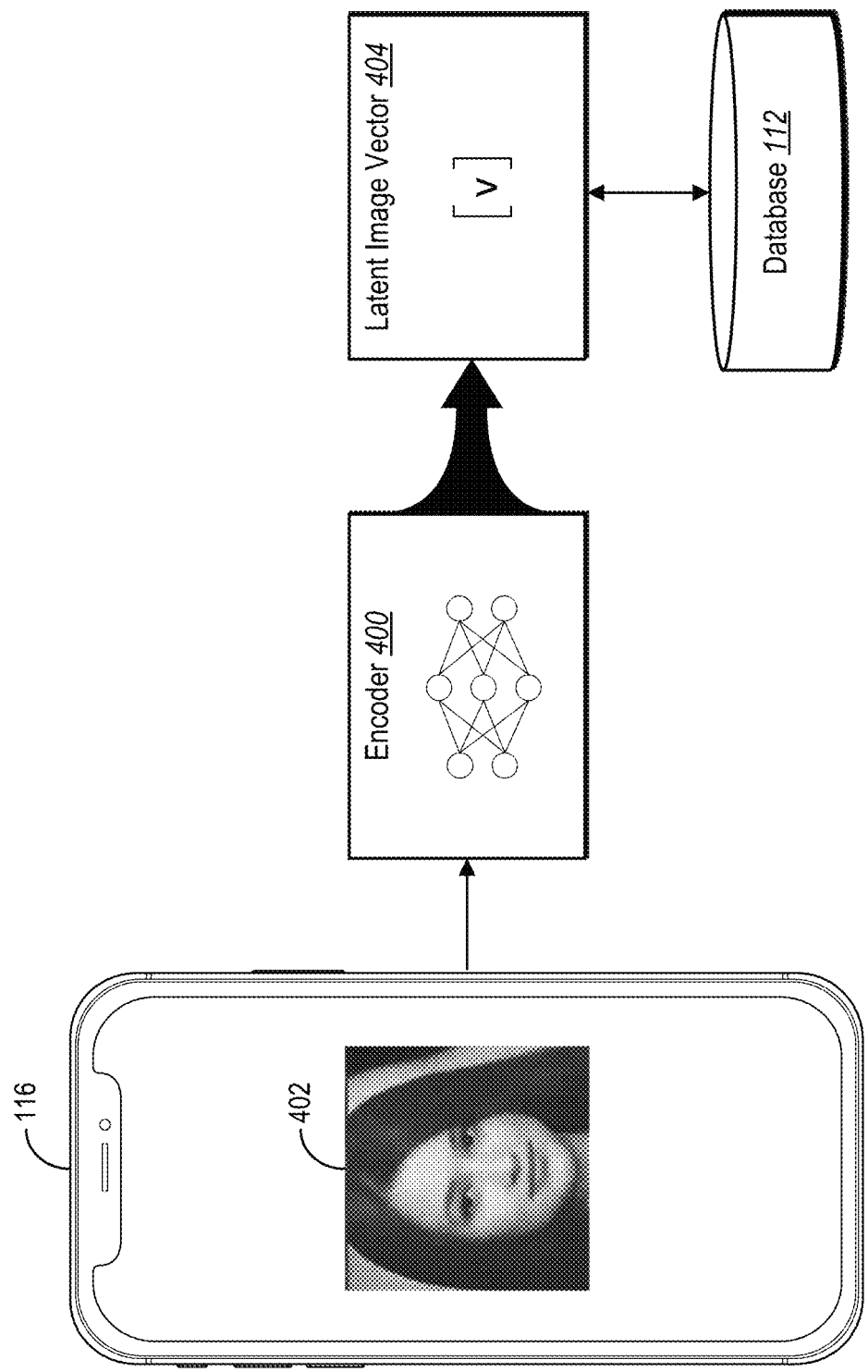
FIG. 4 illustrates an example process for extracting a latent image vector in accordance with one or more embodiments.

As mentioned above, in certain described embodiments, the latent vector image editing system 102 generates or extracts a latent image vector from a digital image. In particular, the latent vector image editing system 102 utilizes an encoder as a prior layer to or as part of an image modification neural network (e.g., the image modification neural network 110) to extract a latent image vector from a digital image. FIG. 4 illustrates the latent vector image editing system 102 extracting a latent image vector 404 from an initial digital image 402 in accordance with one or more embodiments.

As illustrated in FIG. 4, the latent vector image editing system 102 identifies an initial digital image 402. In particular, the latent vector image editing system 102 receives the initial digital image 402 (or an indication of the initial digital image 402) from the client device 116. For instance, the client device 116 captures the initial digital image 402 and uploads the initial digital image 402 for access by the latent vector image editing system 102. As another example, the client device 116 provides an indication of a user selection of the initial digital image, whereupon the latent vector image editing system 102 accesses the initial digital image 402 from a repository of digital images (e.g., stored within the database 112).

As further illustrated in FIG. 4, the latent vector image editing system 102 utilizes an encoder 400 (e.g., as a prior layer to or part of the image modification neural network 110) to analyze the initial digital image 402. More specifically, the latent vector image editing system 102 utilizes the encoder 400 to process the initial digital image 402 to extract features to include within a latent image vector 404. Indeed, the latent vector image editing system 102 generates the latent image vector 404 from the initial digital image 402. Thus, the latent image vector 404 includes features that represent visible and/or unobservable hidden features of the digital image 402. In one or more embodiments, the latent vector image editing system 102 further stores the latent image vector 404 in the database 112.

Figure 5:
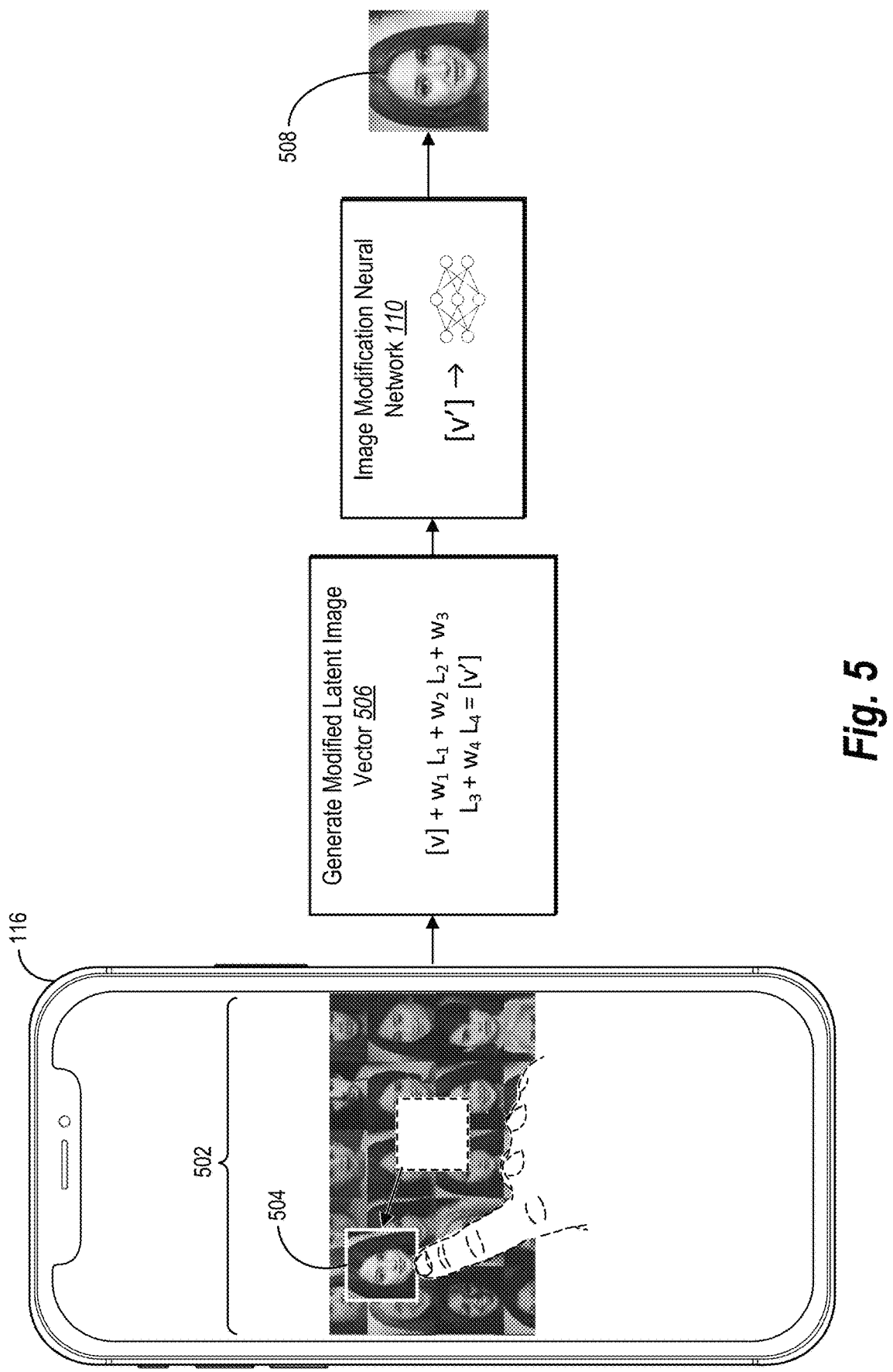
FIG. 5 illustrates an example process for generating a modified digital image from a modified latent image vector in accordance with one or more embodiments.

As mentioned, in some embodiments, the latent vector image editing system 102 generates a modified digital image from a modified latent image vector. In particular, the latent vector image editing system 102 generates a modified latent image vector based on a user interaction to modify a digital image, and the latent vector image editing system 102 further generates a modified digital image from the modified latent image vector. FIG. 5 illustrates an example process for generating a modified digital image from a modified latent image vector in accordance with one or more embodiments.

As illustrated in FIG. 5, the latent vector image editing system 102 receives an indication of a user interaction to modify an initial digital image 504. For instance, FIG. 5 illustrates a user interaction to slide the initial digital image 504 from an initial position over a grid 502 of additional digital images to a new position. At the initial position, the initial digital image 504 included features corresponding to the digital images within the grid 502 that were overlaid by the initial digital image 504. In response to user interaction to slide the initial digital image 504 to the new position, the latent vector image editing system 102 generates a modified digital image (e.g., a modified version of the initial digital image 504) to include features of digital images within the grid 502 that are underneath the digital image at the new position.

Indeed, upon receiving an indication of a user interaction to modify the digital image, the latent vector image editing system 102 performs an act 506 to generate a modified latent image vector. Specifically, the latent vector image editing system 102 modifies the latent image vector according to the user interaction. In some cases, the latent vector image editing system 102 modifies the latent image vector by combining features of the latent image vector with features of one or more additional latent image vectors corresponding to additional digital images. For example, the latent vector image editing system 102 combines the latent image vector with one or more additional latent image vectors corresponding to the digital images that are overlaid by the initial digital image 504 within the grid 502.

In certain embodiments, the latent vector image editing system 102 proportionally combines latent image vectors. To elaborate, the latent vector image editing system 102 determines (or receives an indication of) portions, areas, or amounts of digital images overlaid by the initial digital image 504 within the grid 502. For example, the latent vector image editing system 102 determines that the initial digital image 504 overlays a first portion of a first additional digital image, a second portion of a second additional digital image, a third portion of a third additional digital image, and a fourth portion of a fourth additional digital image (e.g., where the various portions are the same or different sizes). Based on the respective overlaid portions, the latent vector image editing system 102 weights the latent image vectors accordingly.

In certain implementations, for instance, the latent vector image editing system 102 accesses latent image vectors $L_1$, $L_2$, $L_3$, and $L_4$ corresponding to the digital images overlaid by the initial digital image 504 in the grid 502. Indeed, in some cases, the latent vector image editing system 102 accesses a repository of latent image vectors corresponding to the digital images within the grid 502. For instance, the latent vector image editing system 102 utilizes the image modification neural network 110 to generate and store the latent image vectors. In any event, the latent vector image editing system 102 weights the vectors $L_1$, $L_2$, $L_3$, and $L_4$ according to their respective overlaid portions (e.g., where vectors of images with more overlap of the initial digital image 504 have higher weights).

The latent vector image editing system 102 further generates the modified latent image vector by combining the weighted vectors of the overlaid digital images with the initial latent image vector of the initial digital image 504. For example, in some embodiments, the latent vector image editing system 102 generates a modified latent image vector by combining latent image vectors according to the following function:

$$[v]+w_1L_1+w_2L_2+w_3L_3+w_4L_4=[v']$$

where [v] represents the initial latent image vector, $w_i$ represents a weight corresponding to an additional latent image vector $L_i$ of an additional digital image, and [v'] represents the modified latent image vector. In some embodiments, the latent vector image editing system 102 modifies the latent image vector by multiplying portions of vectors together. For example, instead of adding latent image vectors together, the latent vector image editing system 102 multiplies latent image vectors to generate a modified latent image vector.

While FIG. 5 illustrates a particular user interaction to modify the initial digital image 504 by sliding the initial digital image 504 to a new position over the grid 502, the latent vector image editing system 102 can implement additional or alternative user interactions. Indeed, as suggested above, in some embodiments, the latent vector image editing system 102 receives indications of user interactions via slider elements or other user interface elements to modify particular image features (e.g., GAN-based image features). For instance, the latent vector image editing system 102 receives an indication of a user interaction via a slider element to increase or decrease a measure of happiness of a face within a digital image. In response, the latent vector image editing system 102 determines a vector direction corresponding to the measure of happiness and multiplies, or adds to or subtracts from, the vector direction based on a measure of increase requested via the user interaction (e.g., from an initial happiness measure of 3 to a modified happiness measure of 10).

Modifying a measure of happiness is one example of a GAN-based image feature that the latent vector image editing system 102 can modify based on user interaction with a slider element. Other examples are mentioned above and illustrated in subsequent figures. In any event, the latent vector image editing system 102 determines a vector direction corresponding to the image feature adjusted via the user interaction and modifies features of the latent image vector associated with the vector direction in a measure corresponding to a measure of adjustment indicated by the user interaction.

In one or more embodiments, the latent vector image editing system 102 receives an indication of a user interaction with an interactive timeline to modify multiple neural-network-based image features at once. For example, the latent vector image editing system 102 receives an indication that a user adjusts a slidable bar over multiple slider elements at once, where each slider element corresponds to a different GAN-based image feature. Thus, the latent vector image editing system 102 generates the modified latent image vector by multiplying, or adding to, or subtracting from, the vector directions of the latent image vector that correspond to the adjustments to the GAN-based image features requested via the user interaction.

In certain embodiments, the latent vector image editing system 102 receives an indication of a user interaction with a collage tool for selecting features from one or more additional digital images to combine with the initial digital image 504. For example, the latent vector image editing system 102 receives a selection of a nose from an additional digital image to combine with facial features of the initial digital image 504. In response to the user interaction with the collage tool, the latent vector image editing system 102 generates the modified latent image vector by combining one or more portions an additional latent image vector (e.g., the portion(s) corresponding to the nose or other selected area) from the additional digital image with the latent image vector of the initial digital image.

In one or more embodiments, the latent vector image editing system 102 receives an indication of a user interaction with a sketch tool of an image modification interface. In particular, the latent vector image editing system 102 receives an indication of one or more strokes made via the sketch tool to add to or otherwise alter the initial digital image with a digital applicator. For example, the latent vector image editing system 102 determines that the user interaction includes strokes to add glasses around the eyes depicted within the initial digital image 504. In response, the latent vector image editing system 102 generates a modified digital image vector. For instance, the latent vector image editing system 102 searches the database 112 to identify a digital image depicted glasses (e.g., glasses within a threshold similarity of those added via the strokes of the sketch tool). In addition, the latent vector image editing system 102 combines the features of the additional digital image (e.g., a portion of the features corresponding to the glasses) with features of the initial latent image vector.

As further illustrated in FIG. 5, in addition to generating the modified latent image vector, the latent vector image editing system 102 performs generates a modified digital image 508 utilizing the image modification neural network 110. In particular, the latent vector image editing system 102 utilizes the image modification neural network 110 to generate the modified digital image 508 from the modified latent image vector. For example, the latent vector image editing system 102 generates the modified digital image 508 that resembles or depicts the modifications requested via the user interaction.

Figure 6:
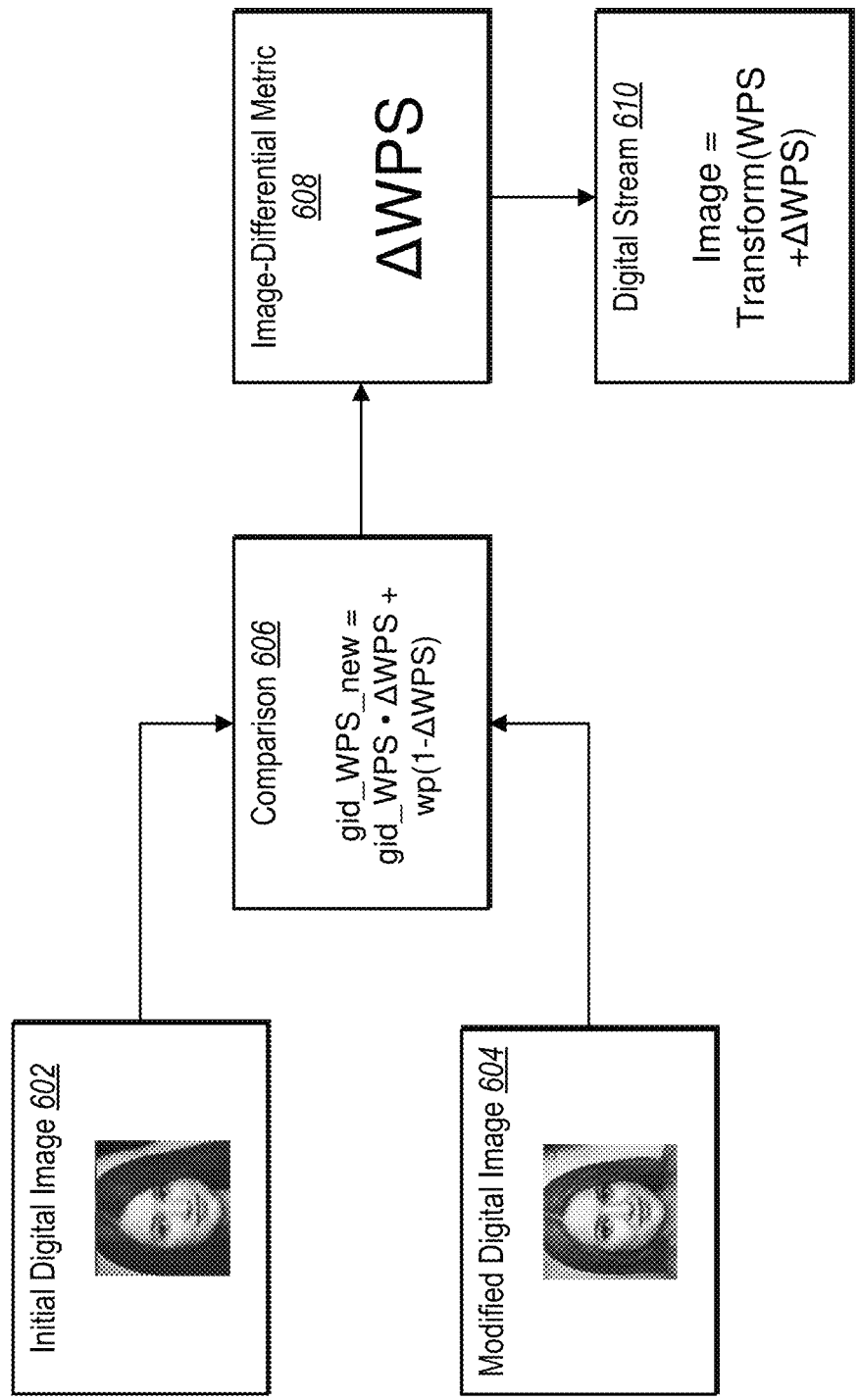
FIG. 6 illustrates an example process for determining and providing an image-differential metric in accordance with one or more embodiments.

As mentioned above, the latent vector image editing system 102 further causes the client device 116 to render and display the modified digital image 508. In particular, the latent vector image editing system 102 determines an image-differential metric based on the modified digital image 508 and provides the image-differential metric to the client device 116 to cause the client device 116 to render the changes to the digital image within an image modification interface. FIG. 6 illustrates generating an image-differential metric and including the image-differential metric as part of a digital stream in accordance with one or more embodiments.

As illustrated in FIG. 6, the latent vector image editing system 102 performs a comparison 606 between an initial digital image 602 and a modified digital image 604. As described above, the latent vector image editing system 102 identifies the initial digital image 602 as a digital image received or indicated by the client device 116. In addition, the latent vector image editing system 102 generates the modified digital image 604 from the initial digital image 602 utilizing the image modification neural network 110, as also described above.

In addition, the latent vector image editing system 102 performs the comparison 606 to determine a difference between the initial digital image 602 and the modified digital image 604. More specifically, the latent vector image editing system 102 determines a visible and/or unobservable difference in the pixels and/or a difference in instructions between displaying the initial digital image 602 and the modified digital image 604. In some cases, the latent vector image editing system 102 determines the difference by comparing the initial latent image vector with the modified latent image vector (e.g., by subtracting the initial image vector from the modified image vector or vice-versa). As shown, the latent vector image editing system 102 performs the comparison 606 by comparing the initial digital image 602 with the modified digital image 604 in accordance with the following function:

$$gid\_WPS\_new = gid\_WPS * \Delta WPS + WP(1 - \Delta WPS)$$

where gid_WPS_new represents an array of latent image vectors corresponding to the modified digital image 604, gid_WPS represents an array of latent image vectors corresponding to the initial digital image 602, WP represents the initial digital image 602, and $\Delta WPS$ represents an image-differential metric 608.

Indeed, as a result of the comparison 606, the latent vector image editing system 102 generates the image-differential metric 608. In particular, the latent vector image editing system 102 generates the image-differential metric 608 that indicates or reflects the difference between the initial digital image 602 and the modified digital image 604. As shown, the latent vector image editing system 102 further includes the image-differential metric 608 within a digital stream 610.

More specifically, the latent vector image editing system 102 modifies the digital stream 610 provided to the client device 116 (e.g., as a stream of digital images and/or other data for presenting and editing a digital video feed) by including the image-differential metric 608. As illustrated, the latent vector image editing system 102 provides the image-differential metric 608 as part of the digital stream 610 to cause the client device 116 to present the transformation of the initial digital image 602 to the modified digital image 604. For example, in some embodiments, the latent vector image editing system 102 causes the client device 116 to render the modified digital image 604 in accordance with the following function:

$$Image = Tranform(WPS) - Images\_stream = Transform(WPS + \Delta WPS)$$

where Image represents the modified digital image 604, Images_stream represents the digital stream 610 provided to the client device 116 for presenting digital images (e.g., as part of digital video feeds), and Transform(.) represents a GAN-based operation. In some cases, Transform(.) is performed by an embodiment of the image modification neural network 110 by, for example, combining features with those of additional digital images and/or adjusting features to increase/decrease measures of happiness or other GAN-based image features. The latent vector image editing system 102 thereby transforms the array of latent image vectors WPS as modified by the image-differential metric $\Delta WPS$.

As mentioned, in one or more embodiments, the latent vector image editing system 102 provides the initial digital image 602 and the modified digital image 604 as part of a digital video feed or other digital data stream. For instance, the latent vector image editing system 102 provides a digital video feed as part of a digital stream (e.g., the digital stream 308 or 610). In certain embodiments, each latent image vector in an array of latent image vectors corresponds to an individual frame of the digital video feed. Thus, the latent vector image editing system 102 provides the initial digital image 602 as a set of frames of a digital video feed where each frame depicts the same initial digital image 602. To update the digital video feed with the modified digital image 604, the latent vector image editing system 102 modifies the set of frames of the digital video feed via the image modification neural network 110 as described above. In addition, the latent vector image editing system 102 generates and provides the image-differential metric 608 to the client device 116 as part of the digital stream 610 to cause the client device 116 to update the digital video feed to present the modified digital image 604.

In some embodiments, the latent vector image editing system 102 performs a step for generating an image-differential metric corresponding to the user interaction. The above description of FIGS. 5-6, particularly the description of the act 506 and the act 508 of FIG. 5 and the description of the comparison 606 of FIG. 6, provide various embodiments and supporting acts and algorithms for performing a step for generating an image-differential metric corresponding to the user interaction.

For example, in some embodiments, the step for generating an image-differential metric corresponding to the user interaction includes generating a modified latent image vector by combining, adding, subtracting, multiplying, or otherwise manipulating an initial latent image vector as described in relation to the act 506. In some embodiments, the step for generating an image-differential metric corresponding to the user interaction includes generating, utilizing the image modification neural network, a modified digital image reflecting an image modification to the initial digital image based on a change within the latent image vector corresponding to the user interaction. In these or other embodiments, the step for generating an image-differential metric corresponding to the user interaction includes determining a difference between the initial digital image and the modified digital image, as particularly described in relation the comparison 606 of FIG. 6.

Figure 7:
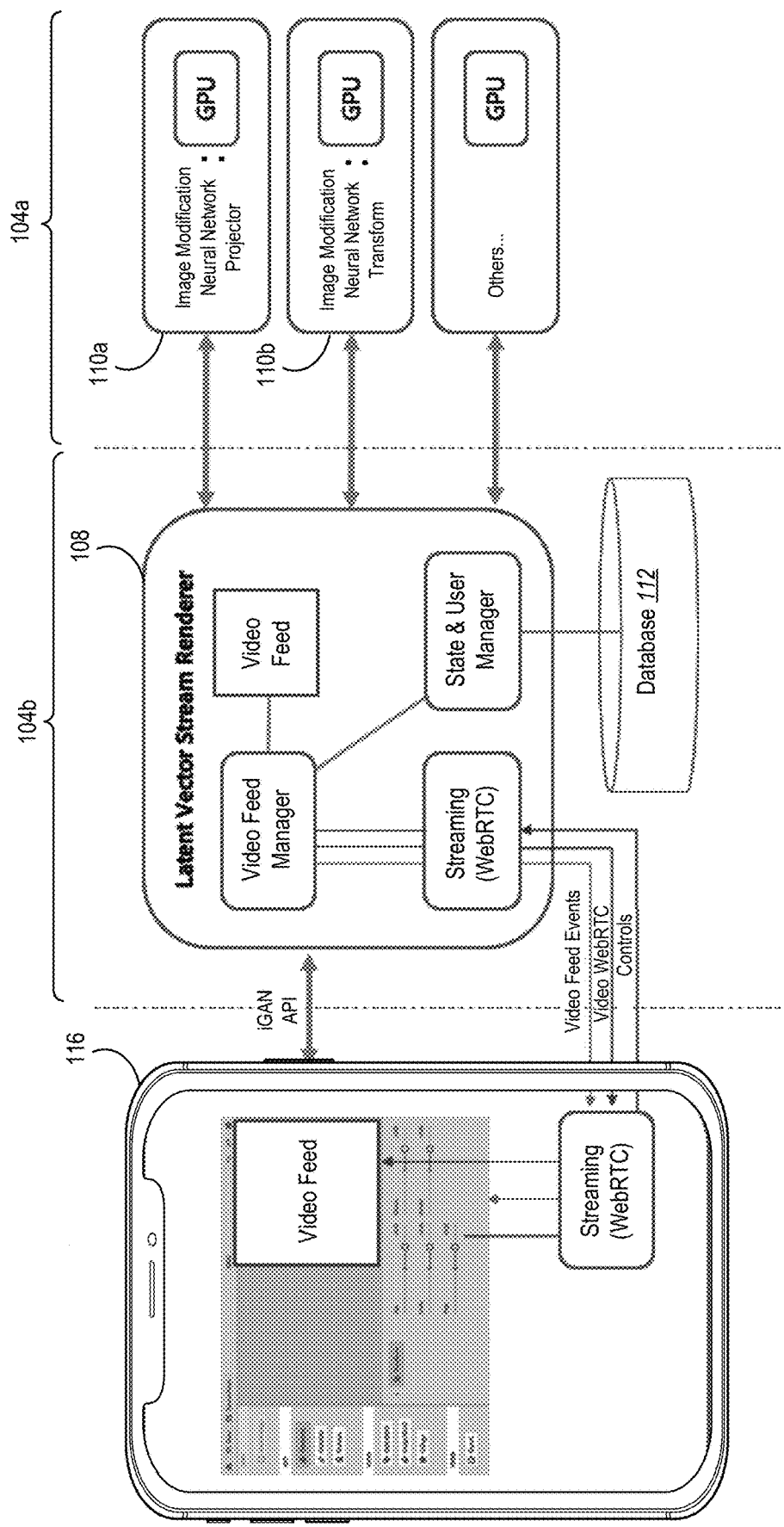
FIG. 7 illustrates an example distributed architecture of the latent vector image editing system in accordance with one or more embodiments.

As mentioned above, in some embodiments, the latent vector image editing system 102 utilizes a distributed architecture of multiple devices at different network locations. In particular, in certain implementations, the latent vector image editing system 102 includes a latent vector stream renderer and an image modification neural network, where the latent vector stream renderer further communicates with a client device. FIG. 7 illustrates an example architecture of the latent vector image editing system 102 in accordance with one or more embodiments.

As illustrated in FIG. 7, the latent vector image editing system 102 includes a latent vector stream renderer 108 at a first network location and one or more image modification neural networks 110 (e.g., the image modification neural network 110a and the image modification neural network 110b) at another network location. Indeed, as shown, the image modification neural network 110a and the image modification neural network 110b are stored on servers 104a (e.g., as part of, or separate from the server(s) 104), while the latent vector stream renderer 108 is stored on a server 104b (e.g., as part of, or separate from the server(s) 104 but separate from the servers 104a). In addition, the latent vector stream renderer 108 communicates with the client device 116 located at a third network location.

As further illustrated in FIG. 7, the latent vector stream renderer 108 includes logic for state management of a connection with the client device 116. In addition, the latent vector stream renderer 108 includes logic for user management, setting up and managing a digital stream connection (e.g., via Web Real-time Communication or WebRTC), storing latent image vectors (e.g., within the database 112), receiving input from the user via a channel associated with the digital stream, and encoding frames or digital images into a digital video feed. As for the digital video feed, the latent vector stream renderer 108 includes logic to establish a WebRTC connection with the client device 116 and to provide a digital stream including a digital video feed to the client device 116 via the connection.

As depicted by FIG. 7, the latent vector stream renderer 108 receives data from the client device 116 to control or trigger various video feed events. For example, the latent vector stream renderer 108 receives indications of user interactions for digital image modifications that modify frames of the digital video. Indeed, in some embodiments, the client device 116 accesses an application programming interface ("API") associated with the latent vector image editing system 102 to request or access operations for digital image editing. In response, the latent vector stream renderer 108 communicates with the image modification neural network 110*b* to perform any modifications to digital images of the video feed corresponding to the user interactions. The latent vector stream renderer 108 further provides video feed events to the client device 116 to update the video feed for rendering and displaying the modified digital images resulting from the user interactions. As mentioned above, the latent vector stream renderer 108 modifies the video feed in real time with the user interactions.

As further illustrated in FIG. 7, the latent vector image editing system 102 includes an image modification neural network 110*a* for extracting latent image vectors from digital images (sometimes referred to as projecting the digital images to latent space). For instance, the latent vector stream renderer 108 receives a digital image from the video feed on the client device 116 and provides the digital image to the image modification neural network 110*a* to extract a latent image vector. As described above, the latent vector stream renderer 108 further modifies the latent image vector based on user interaction and utilizes an image modification neural network to generate a modified digital image from the modified latent image vector.

Indeed, in some embodiments, the latent vector stream renderer 108 utilizes the image modification neural network 110*a* for projections and further utilizes the image modification neural network 110*b* for generating modified digital images from modified latent image vectors (sometimes referred to as transformations). To elaborate, the image modification neural network 110*b* analyzes a modified latent vector to transform the latent image vector back into an image space. In some cases, the image modification neural network 110*b* is the same (or at least the same type of) neural network as the image modification neural network 110*a*.

In certain embodiments, the latent vector image editing system 102 utilizes a batch rendering technique. More specifically, the latent vector image editing system 102 parallelly processes multiple latent image vectors for a given digital video feed. For example, the latent vector image editing system 102 utilizes the image modification neural network 110*b* to simultaneously or concurrently generate modified digital images for multiple digital images of a digital video feed using a GPU (e.g., across multiple threads). For instance, the latent vector image editing system 102 leverages the GPU to implement the image modification neural network 110*b* to generate a plurality of modified digital images in parallel, each image corresponding to a different latent image vector within an array of vectors for a digital video feed. For example, the latent vector image editing system 102 generates modified digital images using the following function:

$$\text{Images} = G(WPS)$$

where Images represents the digital images or frames of a digital video feed, WPS represents an array of latent image vectors for the digital video feed, and G represents the generative model or decoding neural-network layers from the image modification neural network 110. Experimenters have demonstrated that the batch technique improves GPU utilization (e.g., a portion or percentage of time one or more GPU kernels are running over the last second) from 5% to 95% compared to merely adjusting a batch size.

Figure 8B:
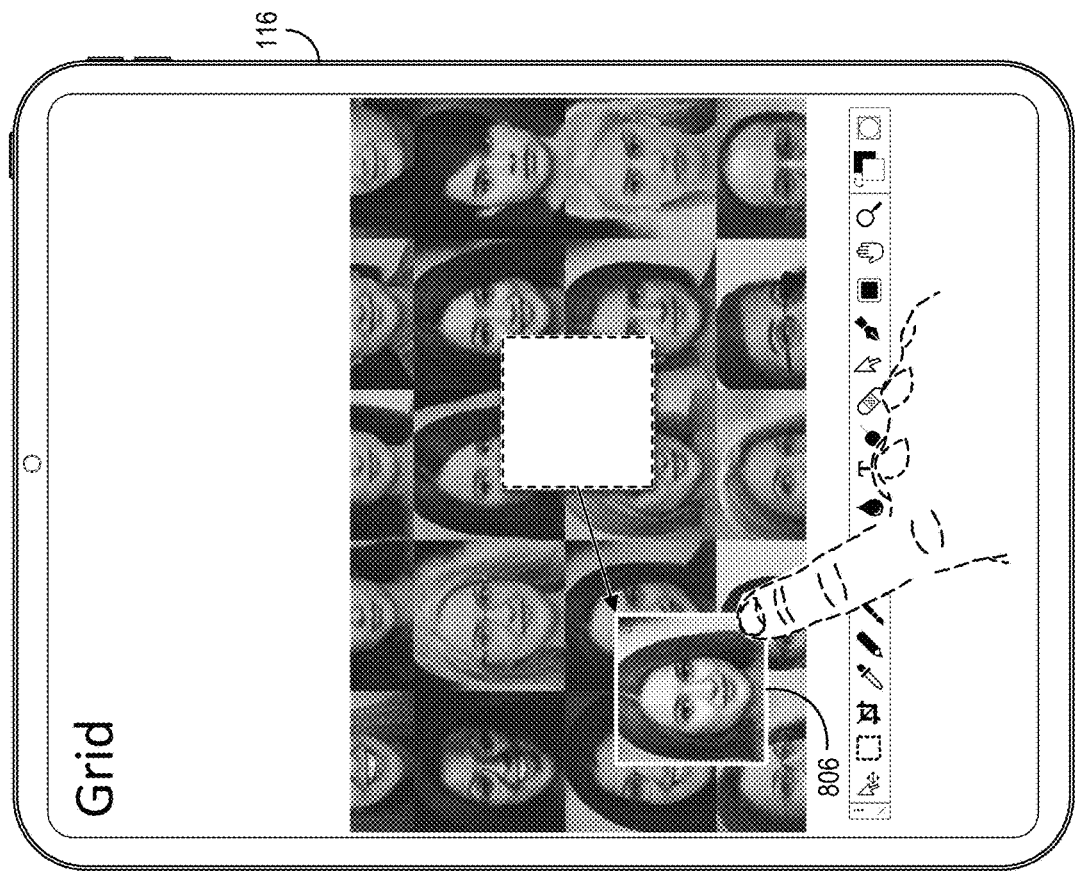
FIGS. 8A-8B illustrate image modification interfaces including a grid of additional digital images in accordance with one or more embodiments.
Figure 8A:
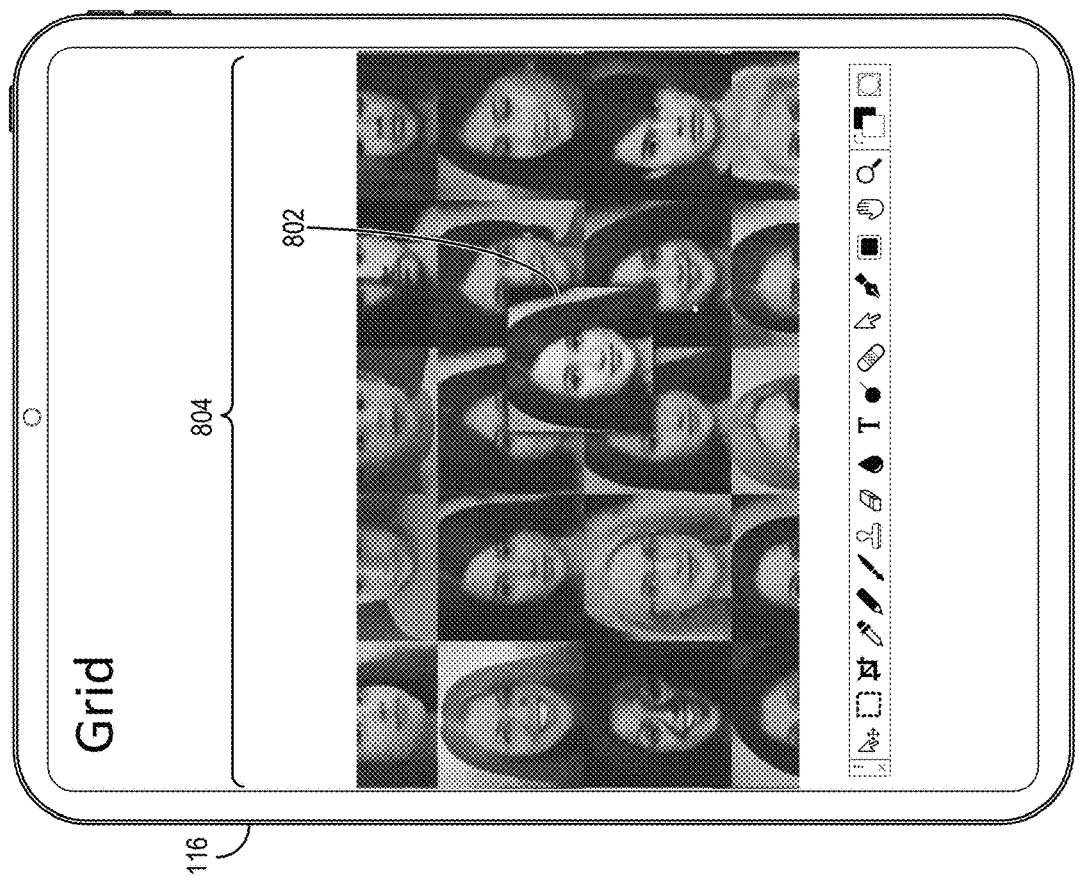

As mentioned, in some embodiments, the latent vector image editing system 102 generates and provides an image modification interface to the client device 116. In particular, the latent vector image editing system 102 provides various interactive tools or elements for interacting with and modifying a digital image within an image modification interface. FIGS. 8A-8B illustrate the client device 116 displaying an image modification interface including a grid of additional digital images for combining features with an initial digital image in accordance with one or more embodiments.

As illustrated in FIG. 8A, the client device 116 displays an image modification interface that includes a grid 804 of digital images and an initial digital image 802 overlaid over images within the grid 804 of digital images. As shown, the initial digital image 802 includes features of four digital images from the grid 804 of digital images overlapped by the initial digital image 802.

In some embodiments, the latent vector image editing system 102 arranges additional images within the grid 804 according to one or more criteria. For example, the latent vector image editing system 102 arranges the additional digital images in the grid 804 according to gradients of their corresponding latent image vectors. For instance, the latent vector image editing system 102 organizes the grid 804 by putting images with similar gradients together. In certain cases, the latent vector image editing system 102 utilizes a particular method for calculating gradients, such as uniform manifold approximation ("UMAP") or t-distributed stochastic neighbor embedding ("TSNE").

By contrast, in one or more embodiments, the latent vector image editing system 102 arranges the additional digital images within the grid 804 according to spatial locality. To elaborate, the latent vector image editing system 102 arranges the additional digital images according to similarity in depicted content. For example, the latent vector image editing system 102 compares latent image vectors associated with a plurality of stored digital images and generates the grid 804 by arranging digital images based on vector similarities in a line-by-line fashion (e.g., row-by-row or column-by-column). For example, by virtue of aligned face images, one scan line consisting of many face images are more likely to have similar content.

In addition or in the alternative to using a gradient or spatial locality, in some embodiments, the latent vector image editing system 102 arranges the additional digital images within the grid 804 according to temporal locality. Because the latent vector space is regularized according to perceptual path length ("PPL"), small changes in latent vectors result in small pixel changes over time. Indeed, the latent vector image editing system 102 determines PPL as a distance measure or amount of "perceptual" change (e.g., measured as a visual geometry group or "VGG" embedding distance). For instance, the latent vector image editing system 102 determines the perceptual change in generated images for corresponding changes to latent image vectors. The latent vector image editing system 102 further arranges the grid 804 according to temporal locality by placing images with smaller perceptual changes closer together. By utilizing spatial locality and/or temporal locality to generate and arrange the grid 804, the latent vector image editing system 102 maintains a high compression ratio batch-generated digital images for video streaming to the client device 116.

As mentioned, in one or more embodiments, the latent vector image editing system 102 receives an indication of a user interaction to move the initial digital image 802 within the grid 804. For example, FIG. 8B illustrates a user interaction to slide the initial digital image 802 to a new location within the grid 804. Based on the user interaction, the latent vector image editing system 102 generates a modified digital image 806 from a modified latent image vector that includes features of the initial digital image 802 along with features of the four digital image overlapped at the new position within the grid 804. For instance, the latent vector image editing system 102 generates the modified digital image 806 to depict a combination of image features from initial digital image 802 as well as underlying digital images at the new position (e.g., in a proportionally weighted combination according to respective overlapping areas). Indeed, as a result of combining the features of the additional digital images, the modified digital image 806 appears different from the initial digital image 802.

In certain embodiments, the latent vector image editing system 102 updates the grid 804 based on user interaction sliding a digital image to different locations. For instance, upon release of a user input (e.g., releasing a mouse or removing a finger from a touch screen) at a new location within the grid 804, the latent vector image editing system 102 rearranges the digital images within the grid 804. In some cases, the latent vector image editing system 102 rearranges the grid 804 based on changes to the digital image. For instance, the latent vector image editing system 102 determines distances of latent image vectors from the (vector of the) initial digital image 802 to generate the initial grid 804. In addition, the latent vector image editing system 102 updates the distances based on the modified digital image 806 and rearranges the grid 804 to, for example, depict digital images with more similar features to the modified digital image 806 closer to the new position.

In certain embodiments, the latent vector image editing system 102 provides grid controls within the image modification interface. For example, the latent vector image editing system 102 provides a zoom control selectable to zoom the grid 804 in and out to display more or fewer digital images. Thus, the latent vector image editing system 102 can present (or cause the client device 116 to present) different levels detail for blending features of digital images that are more or less similar to an initial digital image.

Figure 9B:
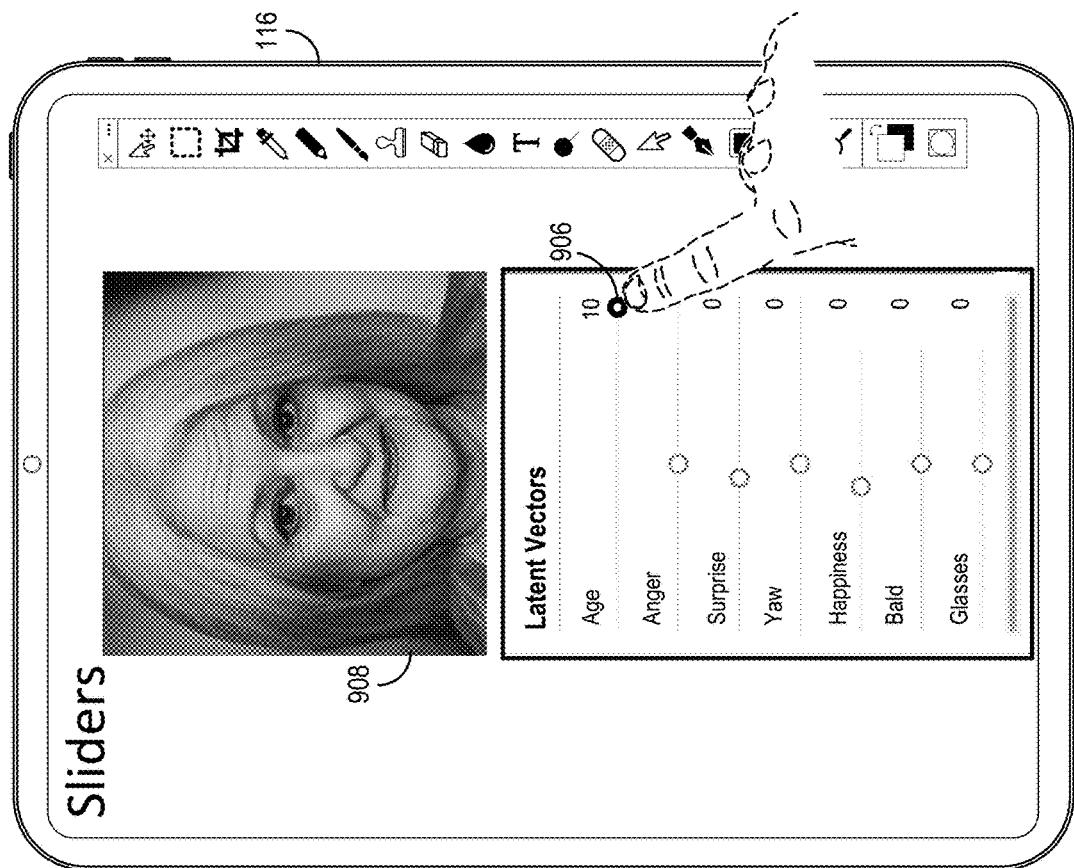
FIGS. 9A-9B illustrate image modification interfaces including a slider tool in accordance with one or more embodiments.
Figure 9A:
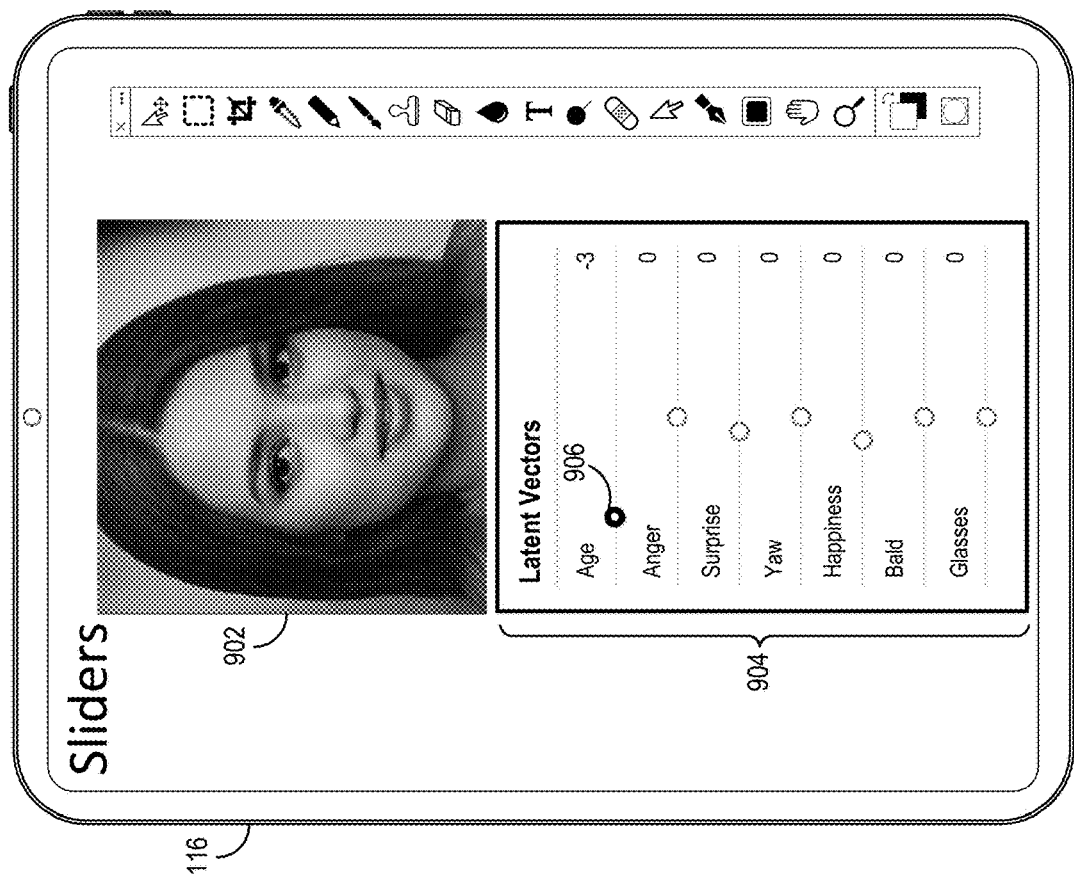

In one or more embodiments, the latent vector image editing system 102 provides an image modification interface that includes selectable slider elements for modifying particular image features (e.g., GAN-based image features) of a digital image. In particular, the image modification interface includes a slider element for each of a number of image features. FIGS. 9A-9B illustrate the client device 116 displaying an image modification interface including slider elements in accordance with one or more embodiments.

As illustrated in FIG. 9A, the client device 116 presents an image modification interface that includes an initial digital image 902 and a modification pane 904. Within the modification pane 904, the image modification interface includes individual slider elements for modifying various image features, including a measure of age, a measure of anger, a measure of surprise, a measure of yaw, a measure of happiness, a measure of baldness, and a measure of glasses depicted in the initial digital image 902. For example, the position of the slider element 906 indicates a measure of age corresponding to the −3 position along the slider. In some embodiments, the slider elements provide discrete attributes changes, while in other embodiments the changes along the slider are continuous.

As mentioned, the latent vector image editing system 102 receives an indication of a user interaction with a slider element to modify the initial digital image 902. FIG. 9B illustrates a user interaction to move the age slider element 906 from the −3 position to the 10 position. In response to the user interaction, the latent vector image editing system 102 determines a vector direction corresponding to the image feature of age and further determines a measure of change corresponding to the vector direction. For instance, the latent vector image editing system 102 determines an amount or a degree to modify the latent image vector (e.g., the vector of the initial digital image 902) in that direction based on the change from −3 to 10. Accordingly, the latent vector image editing system 102 generates the modified latent image vector, generates the modified digital image 908, and provides an image-differential metric to the client device 116 for rendering the modified digital image 908. As shown, the modified digital image 908 depicts a face that is much older than the face of the initial digital image 902, while preserving other feature of the image to maintain other elements of the appearance.

In a similar fashion, for other slider elements, the latent vector image editing system 102 performs the same process. That is, the latent vector image editing system 102 determines a vector direction corresponding to the image feature adjusted by the user interaction, modifies the latent image vector, generates a modified digital image from the modified latent image vector, determines an image-differential metric, and provides the image-differential metric to the client device 116 to render the change.

In certain described embodiments, the latent vector image editing system 102 provides an image modification interface that includes a timeline element. In particular, the latent vector image editing system 102 provides a time element that is selectable for modifying multiple image features simultaneously with a single user interaction. FIGS. 10A-10B illustrate the client device 116 displaying an image modification interface that includes a timeline element in accordance with one or more embodiments.

As illustrated in FIG. 10A, the client device 116 displays an initial digital image 1002 and a timeline element that includes a plurality of slider elements 1004 and a slidable bar 1006. As shown, the slidable bar 1006 within the timeline element indicates values along a number of vector directions for modifying the initial digital image 1002. Thus, in response to user interaction to adjust a size and/or position of any of the slider elements 1004 relative to the slidable bar 1006, the latent vector image editing system 102 modifies the corresponding individual image features (e.g., by modifying the initial latent image vector in the appropriate vector direction).

In addition, in response to user interaction to move the slidable bar 1006, the latent vector image editing system 102 modifies all of the image features for the plurality of slider elements 1004. Indeed, by moving the slidable bar 1006, the adjusts the values for each of the image features associated with the individual slider elements. In response, the latent vector image editing system 102 generates a modified latent image vector and the modified digital image 1008. Indeed, the latent vector image editing system 102 generates and provides an image-differential metric to the client device 116 to cause the client device 116 to render the modified digital image 1008. As shown in FIG. 10B, the modified digital image 1008 includes glasses along with some other image feature changes based on the user interaction to move the slidable bar 1006 to the right along the timeline.

Figure 11A:
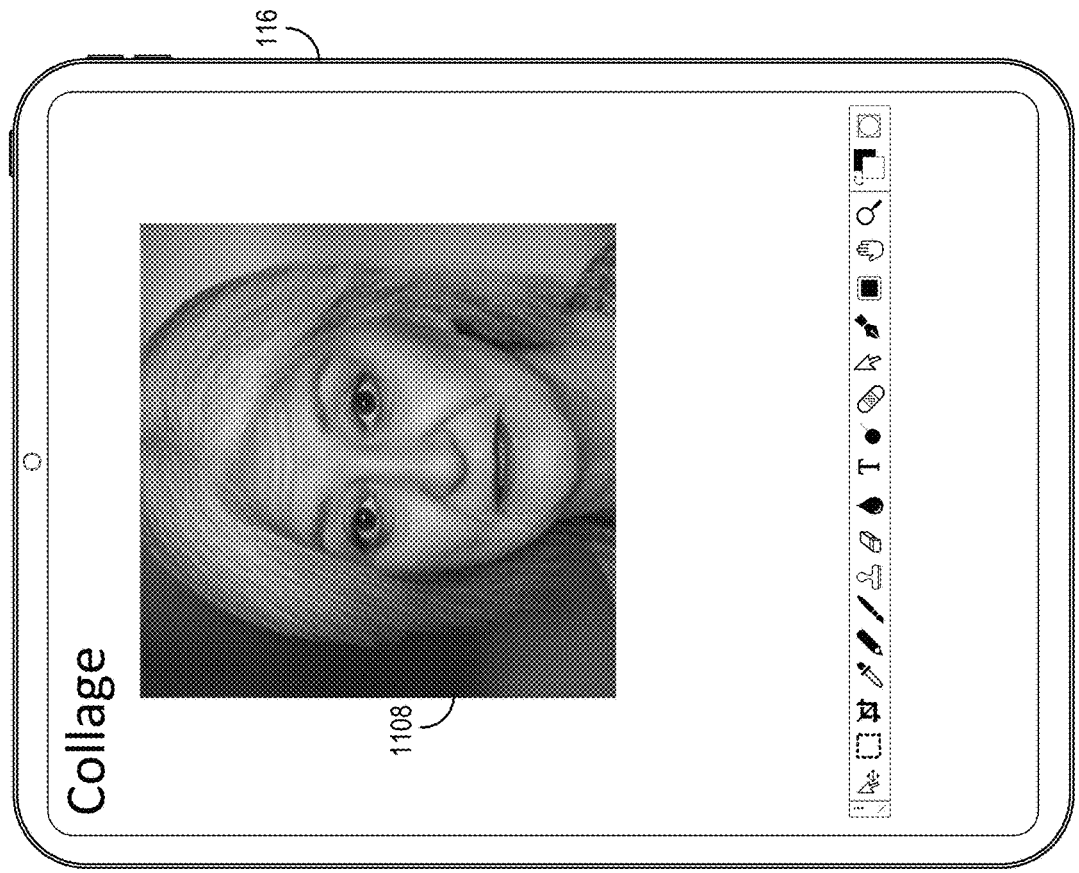
FIGS. 11A-11B illustrate image modification interfaces including a collage tool in accordance with one or more embodiments.
Figure 11B:
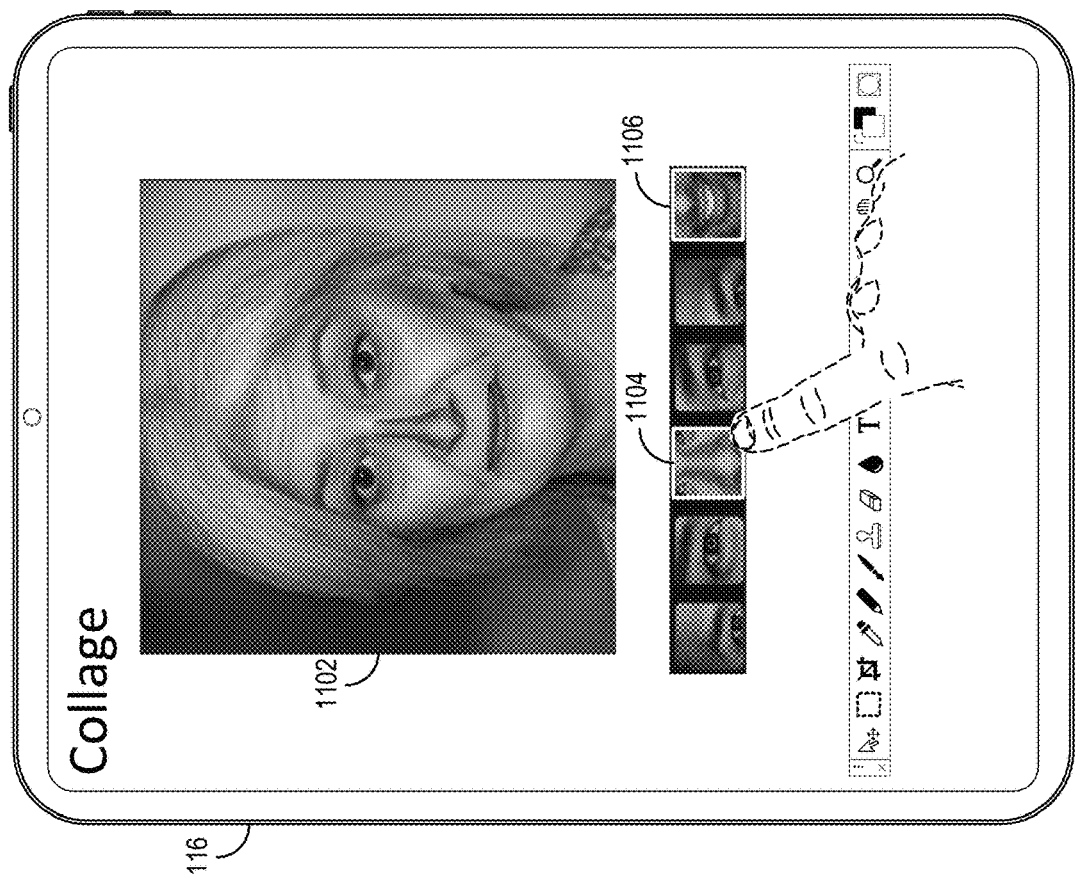

In some embodiments, the latent vector image editing system 102 provides an image modification interface that includes a collage tool. In particular, the latent vector image editing system 102 provides a collage tool for selecting image features from one or more additional digital images to combine with an initial digital image. FIGS. 11A-11B illustrate the client device 116 displaying an image modification interface that includes a collage tool in accordance with one or more embodiments.

As illustrated in FIG. 11A, the client device 116 presents the image modification interface including an initial digital image and a collage tool that enables selection of various features of an additional digital image. As shown, the collage tool includes a number of selectable features corresponding to different portions of an additional digital image. For instance, the collage tool includes a nose element 1104 that can be selected to combine nose features of the additional digital image within the initial digital image, as well as a mouth element 1106 that can be selected to combine mouth features of the additional digital image with the initial digital image.

Based on user interaction selecting the nose element 1104 and the mouth element 1106, the latent vector image editing system 102 generates a modified latent image vector by combining the corresponding latent features of the additional digital image (e.g., those features corresponding to the selected nose element 1104 and mouth element 1106). In addition, the latent vector image editing system 102 generates a modified digital image 1108 and causes the client device 116 to render the modified digital image 1108 (e.g., by providing an image-differential metric).

Indeed, FIG. 11B illustrates the client device 116 presenting the modified digital image 1108 with a nose and a mouth modified by combining the corresponding features with those of the additional digital image. To generate the modified digital image 1108, in some embodiments, the latent vector image editing system 102 modifies the latent image vector to reflect some constraint. For instance, the latent vector image editing system 102 includes portions of both the initial digital image 1102 and the additional digital image within the modified latent image vector to ensure that the resulting image has face parts from both the initial digital image 1102 and the selected portions of the additional digital image.

Figure 12B:
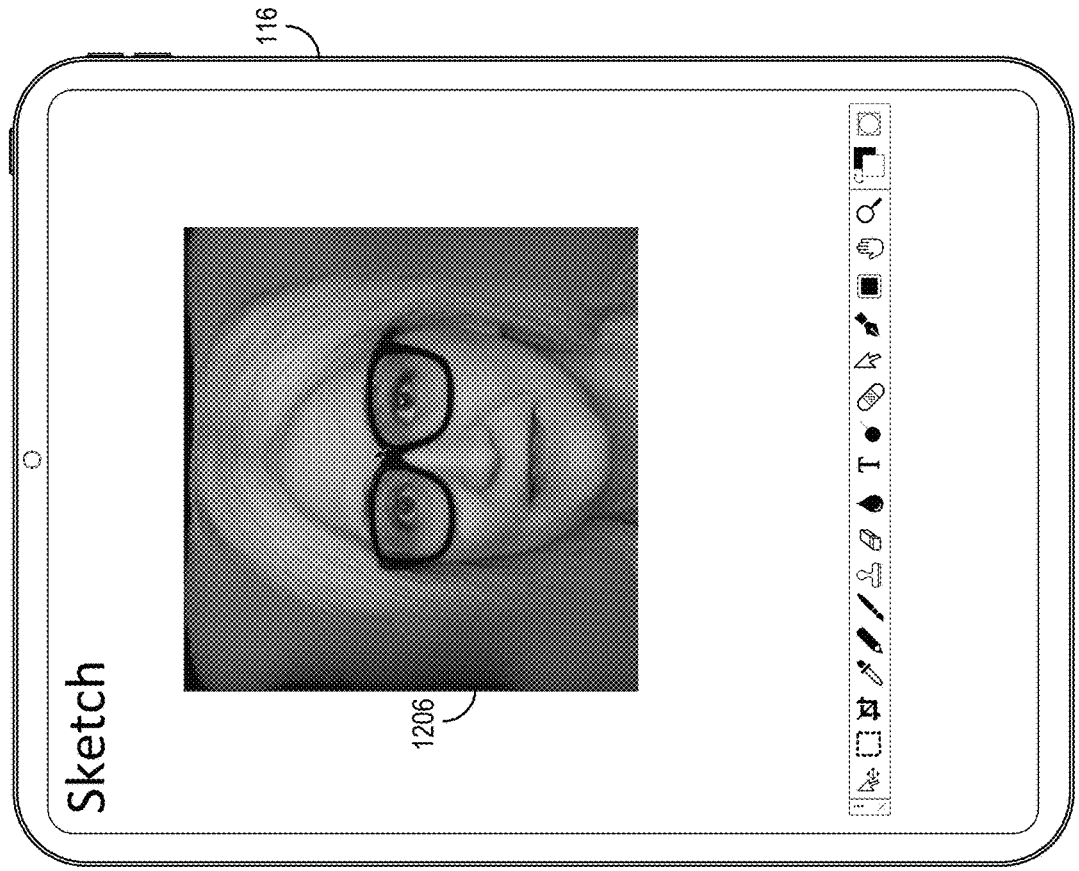
FIGS. 12A-12B illustrate image modification interfaces including a sketch tool in accordance with one or more embodiments.
Figure 12A:
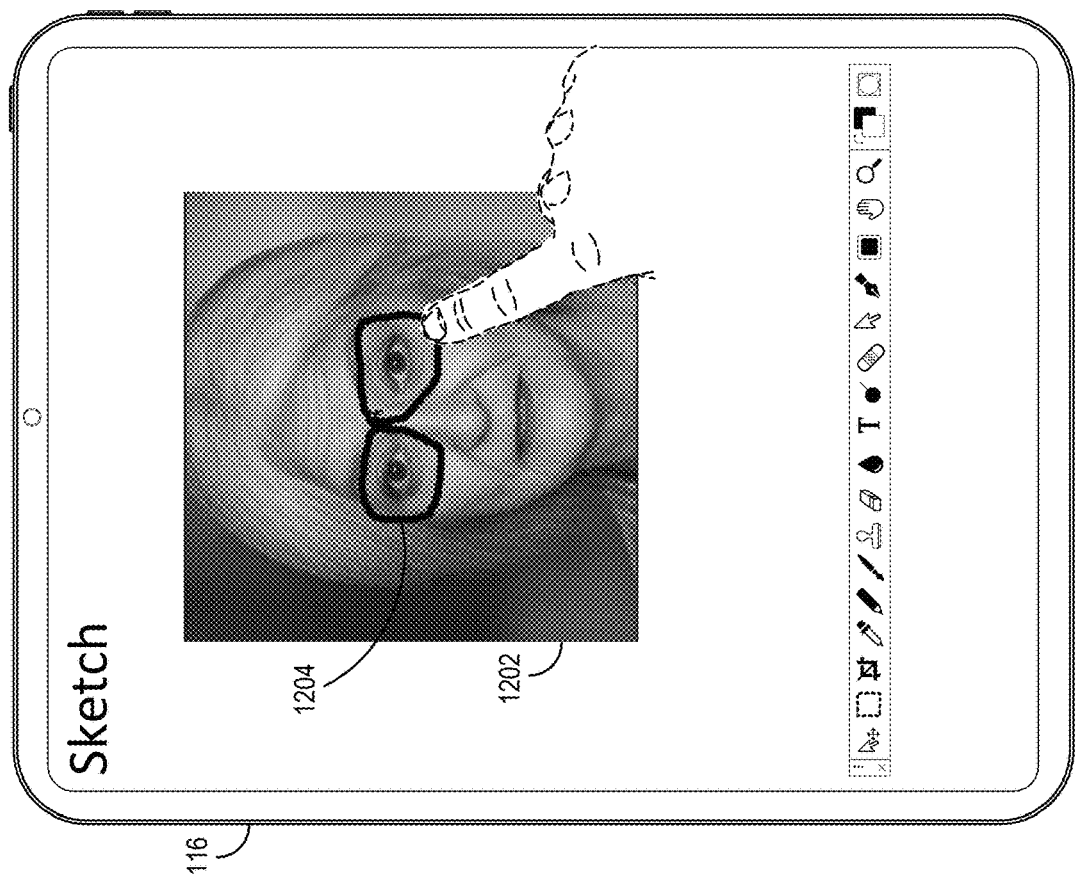

In one or more embodiments, the latent vector image editing system 102 provides an image modification interface that includes a sketch tool. In particular, the latent vector image editing system 102 provides an image modification interface that includes a sketch tool for drawing strokes on an initial digital image to add (or remove) various features. FIGS. 12A-12B illustrate the client device 116 displaying an image modification interface including a sketch tool in accordance with one or more embodiments.

As illustrated in FIG. 12A, the client device 116 displays an image modification interface including an initial digital image 1202. In addition, the image modification interface includes a strokes 1204 (drawn via a digital applicator) in the shape of glasses around the eyes of the face in the initial digital image 1202. The latent vector image editing system 102 receives an indication of the strokes 1204 and generates a modified digital image.

In particular, the latent vector image editing system 102 searches a repository of digital images within the database 112 to identify one or more additional digital images that depict a face with glasses resembling the strokes 1204. The latent vector image editing system 102 further extracts, or accesses from the database 112, latent image vectors corresponding to the identified digital images.

In addition, the latent vector image editing system 102 combines features of the identified digital image(s) (e.g., those features corresponding to the glasses) with features of the initial digital image 1202. For instance, the latent vector image editing system 102 generates a modified latent image vector by combining latent features of the initial latent image vector with those of the identified latent image vectors of images with glasses corresponding to the strokes 1204. Thus, as illustrated in FIG. 12B, the latent vector image editing system 102 generates the modified digital image 1206 depicting glasses on a face that otherwise resembles the face in the initial digital image 1202.

Figure 13:
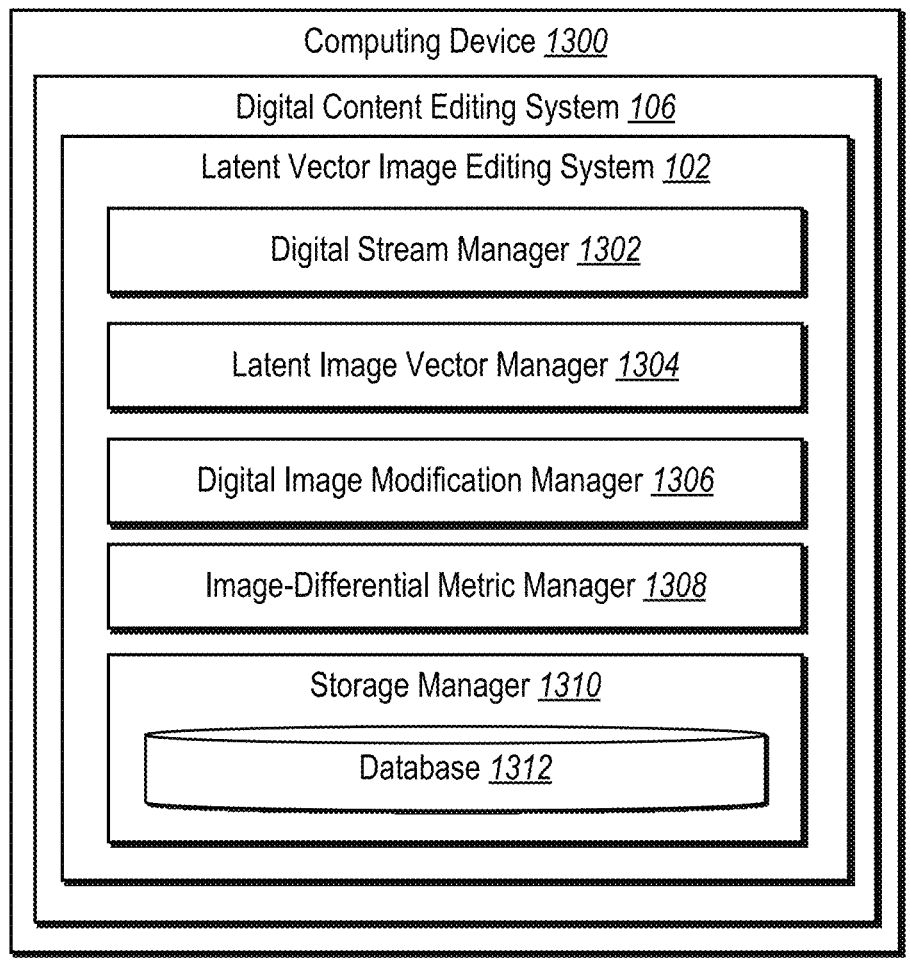
FIG. 13 illustrates a schematic diagram of a latent vector image editing system in accordance with one or more embodiments.

Looking now to FIG. 13, additional detail will be provided regarding components and capabilities of the latent vector image editing system 102. Specifically, FIG. 13 illustrates an example schematic diagram of the latent vector image editing system 102 on an example computing device 1300 (e.g., one or more of the client device 116 and/or the server(s) 104). In some embodiments, the computing device 1300 refers to a distributed computing system where different managers are located on different devices, as described above. In certain embodiments, for example, the computing system includes multiple computing devices (e.g., servers), one for the latent vector stream renderer 108 and a separate device for the image modification neural network 110. As shown in FIG. 13, the latent vector image editing system 102 includes a digital stream manager 1302, a latent image vector manager 1304, a digital image modification manager 1306, an image-differential manager 1308, and a storage manager 1310.

As just mentioned, the latent vector image editing system 102 includes a digital stream manager 1302. In particular, the digital stream manager 1302 manages, maintains, generates, provides, streams, transmits, processes, modifies, or updates a digital stream provided to a client device. For example, the digital stream manager 1302 provides a digital stream for rendering a digital image as part of a digital video feed. In addition, the digital stream manager 1302 updates the digital stream to provide an image-differential metric to the client device for rendering a modification to the digital image and/or the digital video feed.

In addition, the latent vector image editing system 102 includes a latent image vector manager 1304. In particular, the latent image vector manager 1304 manages, maintains, extracts, encodes, determines, generates, modifies, updates, provides, receives, transmits, processes, analyzes, or identifies latent image vectors. For example, the latent image vector manager 1304 extracts a latent image vector from a digital image. In addition, the latent image vector manager 1304 modifies the latent image vector based on user interaction for editing a digital image (e.g., via a GAN-based operation).

As illustrated in FIG. 13, the latent vector image editing system 102 also includes a digital image modification manager 1306. In particular, the digital image modification manager 1306 manages, maintains, generates, modifies, updates, provides, receives, or identifies modified digital images. For example, the digital image modification manager 1306 generates a modified digital image from a modified latent image vector. In addition, the digital image modification manager 1306 provides the modified digital image to the image-differential manager 1308 for generating an image-differential metric.

Indeed, as shown, the latent vector image editing system 102 further includes an image-differential manager 1308. In particular, the image-differential manager 1308 manages, maintains, determines, generates, updates, provides, transmits, or identifies image-differential metrics. For example, the image-differential manager 1308 compares an initial digital image with a modified digital image to determine an image-differential metric that reflects the difference between the initial digital image and the modified digital image. In addition, the image-differential manager 1308 provides the image-differential metric to the digital stream manager 1302, whereupon the digital stream manager 1302 provides the image-differential metric to a client device (e.g., to cause the client device to render the modified digital image).

The latent vector image editing system 102 further includes a storage manager 1310. The storage manager 1310 operates in conjunction with, or includes, one or more memory devices such as the database 1312 (e.g., the database 112) that store various data such as a repository of digital images and a repository of latent image vectors. The storage manager 1310 (e.g., via a non-transitory computer memory/one or more memory devices) stores and maintains data associated with modifying latent image vectors, generating modified digital images, and determining image-differential metrics (e.g., within the database 1312).

In one or more embodiments, each of the components of the latent vector image editing system 102 are in communication with one another using any suitable communication technologies. Additionally, the components of the latent vector image editing system 102 is in communication with one or more other devices including one or more client devices described above. It will be recognized that although the components of the latent vector image editing system 102 are shown to be separate in FIG. 13, any of the subcomponents may be combined into fewer components, such as into a single component, or divided into more components as may serve a particular implementation. Furthermore, although the components of FIG. 13 are described in connection with the latent vector image editing system 102, at least some of the components for performing operations in conjunction with the latent vector image editing system 102 described herein may be implemented on other devices within the environment.

The components of the latent vector image editing system 102 can include software, hardware, or both. For example, the components of the latent vector image editing system 102 can include one or more instructions stored on a computer-readable storage medium and executable by processors of one or more computing devices (e.g., the computing device 1300). When executed by the one or more processors, the computer-executable instructions of the latent vector image editing system 102 can cause the computing device 1300 to perform the methods described herein. Alternatively, the components of the latent vector image editing system 102 can comprise hardware, such as a special purpose processing device to perform a certain function or group of functions. Additionally, or alternatively, the components of the latent vector image editing system 102 can include a combination of computer-executable instructions and hardware.

Furthermore, the components of the latent vector image editing system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the latent vector image editing system 102 may be implemented as part of a stand-alone application on a personal computing device or a mobile device. Alternatively, or additionally, the components of the latent vector image editing system 102 may be implemented in any application that allows creation and delivery of marketing content to users, including, but not limited to, applications in ADOBE® EXPERIENCE MANAGER and CREATIVE CLOUD®, such as ADOBE® STOCK, PHOTOSHOP®, LIGHTROOM®, and INDESIGN®. "ADOBE," "ADOBE EXPERIENCE MANAGER," "CREATIVE CLOUD," "ADOBE STOCK," "PHOTOSHOP," "LIGHTROOM," and "INDESIGN" are either registered trademarks or trademarks of Adobe Inc. in the United States and/or other countries.

FIGS. 1-13 the corresponding text, and the examples provide a number of different systems, methods, and non-transitory computer readable media for generating and providing an image-differential metric by comparing digital images associated with latent image vectors. In addition to the foregoing, embodiments can also be described in terms of flowcharts comprising acts for accomplishing a particular result. For example, FIG. 14 illustrates a flowchart of example sequences or series of acts in accordance with one or more embodiments.

While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer readable medium can comprise instructions, that when executed by one or more processors, cause a computing device to perform the acts of FIG. 14. In still further embodiments, a system can perform the acts of FIG. 14. Additionally, the acts described herein may be repeated or performed in parallel with one another or in parallel with different instances of the same or other similar acts.

FIG. 14 illustrates an example series of acts 1400 for generating and providing an image-differential metric by comparing digital images associated with latent image vectors. In particular, the series of acts 1400 includes an act 1402 of extracting a latent image vector from an initial digital image. For example, the act 1402 involves extracting a latent image vector from an initial digital image displayed via a client device. In some cases, the act 1402 involves extracting the initial latent image vector from the initial digital image displayed via a mobile device as the client device.

In addition, the series of acts 1400 includes an act 1404 of receiving an indication to modify the initial digital image digital image. In particular, the act 1404 involves receive an indication of a user interaction to modify the initial digital image. For example, the act 1404 involves receiving the indication of the user interaction to modify the initial digital image by receiving an indication of a user interaction selecting one or more additional digital images to combine with the digital image. In addition, the series of acts 1400 includes an act of generating a modified latent image vector by combining the latent image vector with one or more additional latent image vectors corresponding to the one or more additional digital images. Further, the series of acts 1400 includes an act of, based on the modified latent image vector, generating the modified digital image depicting a combination of image features from the initial digital image and the one or more additional digital images utilizing the image modification neural network.

In some embodiments, the act 1404 involves receiving an indication of a user interaction to modify an image feature of the initial digital image. In addition, the series of acts 1400 includes an act of modifying the latent image vector to represent the modified image feature in a modified latent feature vector. Further, the series of acts 1400 includes an act of generating the modified digital image based on a modified latent image vector utilizing a generative adversarial neural network (GAN) as the image modification neural network. In some cases, the series of acts 1400 includes an act of providing the image-differential metric to the mobile device (in real time) in response to the user interaction.

In at least one embodiment, the series of acts 1400 includes an act of providing, for display on the client device, an image modification interface comprising a sketch tool for drawing strokes on the initial digital image. In addition, the series of acts 1400 includes an act of, based on receiving an indication of strokes drawn on the initial digital image, providing the image-differential metric to the client device for rendering the modified digital image including an overlay of additional image features corresponding to the strokes. In some cases, the act 1404 involves receiving an indication of moving the initial digital image to overlay additional digital images within the grid of digital images.

As illustrated, the series of acts 1400 includes an act 1406 of determining an image-differential metric. In particular, the act 1406 involves, in response to the indication of the user interaction, determining an image-differential metric reflecting an image modification to the initial digital image performed by an image modification neural network based on a change within the latent image vector corresponding to the user interaction. For example, the act 1406 involves modifying the latent image vector utilizing a first computing device in response to the indication of the user interaction to modify the digital image, generating the modified digital image from the modified latent image vector utilizing the image modification neural network on a second computing device, and determining a difference between the initial digital image and the modified digital image utilizing the first computing device. Modifying the latent image vector can involve determining a vector direction and a measure of change corresponding to the vector direction associated with the user interaction and modifying the latent image vector in the vector direction according to the measure of change.

In some embodiments, the act 1406 involves generating, utilizing the image modification neural network, a modified digital image reflecting an image modification to the initial digital image based on a change within the latent image vector corresponding to the user interaction and determining a difference between the initial digital image and the modified digital image. Generating the modified digital image can involve processing a modified latent image vector corresponding to the change within the latent image vector utilizing the image modification neural network on a server device at a first location. In some cases, determining the image-differential metric involves determining the difference between the initial digital image and the modified digital image via a computing device at a second location.

The series of acts 1400 further includes an act 1408 of providing the image-differential metric for rendering a modified digital image. In particular, the act 1408 involves providing the image-differential metric to the client device for rendering a modified digital image depicting the image modification. In at least one embodiment, the series of acts 1400 includes an act of modifying the latent image vector in a vector direction corresponding to the user interaction. In addition, the act 1408 can involve generating the modified digital image from the modified latent image vector by performing a GAN-based operation utilizing the image modification neural network. In some cases, the act 1408 involves providing the image-differential metric for rendering the modified digital image within a browser on the client device at a third location. For example, the act 1408 involves providing the image-differential metric to the client device for rendering the modified digital image depicting a combination of image features from the initial digital image and the additional digital images within the grid of digital images.

In certain embodiments, the series of acts 1400 includes acts of receiving an indication of a first amount of a first additional digital image underlying the digital image within the grid of digital images, receiving an indication of a second amount of a second additional digital image underlying the digital image within the grid of digital images, and generating a modified latent image vector by proportionally combining the initial latent image vector with a first additional initial latent image vector and a second additional latent image vector respectively according to the first amount and the second amount.

In some cases, the series of acts 1400 includes an act of providing, for display on the client device, an image modification interface comprising a depiction of the digital image and slider elements selectable to adjust image features of the initial digital image. Further, the series of acts 1400 includes an act of, based on receiving an indication of a slider element adjusting image features of the initial digital image, providing the image-differential metric to the client device for rendering the modified digital image comprising adjusted image features. In some embodiments, the series of acts 1400 includes an act of providing, for display on the client device, an image modification interface comprising a depiction of the initial digital image, slider elements selectable to selectable to adjust image features of the initial digital image, and a slidable bar selectable to simultaneously adjust multiple image features of the initial digital image.

In one or more embodiments, the series of acts 1400 includes an act of providing, for display on the client device, an image modification interface comprising a collage tool for selecting image features from an additional digital image to combine with the initial digital image. Further, the series of acts 1400 can include an act of, based on receiving an indication of selected imaged features from the additional digital image, providing the image-differential metric to the client device for rendering the modified digital image depicting a combination of image features from the initial digital image and selected image features from the additional digital image.

In some cases, the series of acts 1400 includes an act of receiving, from a computing device comprising an image modification neural network, a latent image vector for a digital image displayed via a client device and an act of providing the digital image to the computing device for extracting the latent image vector from the digital image utilizing a generative adversarial neural network (GAN). In these or other cases, the series of acts 1400 includes an act of, based on the latent image vector, providing an initial digital stream to the client device to cause the client device to display the initial digital image and an act of providing the image-differential metric as part of a modified digital stream to the client device to cause the client device to display the modified digital image in place of the initial digital image.

In some embodiments, the series of acts 1400 includes an act of, based on the latent image vector, providing an initial digital stream to the client device to cause the client device to display the initial digital image. In these or other embodiments, the series of acts 1400 includes an act of providing the image-differential metric as part of a modified digital stream to the client device to cause the client device to display the modified digital image in place of the initial digital image.

In one or more embodiments, the series of acts 1400 includes an act of receiving an additional indication of an additional user interaction to modify the initial digital image. In addition, the series of acts 1400 includes an act of, in response to the additional indication of the additional user interaction, generating an additional image-differential metric indicating a difference between the modified digital image and a further modified digital image. Further, the series of acts 1400 can include an act of providing the additional image-differential metric as part of a digital stream to the client device for rendering the additional modified digital image in place of the modified digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
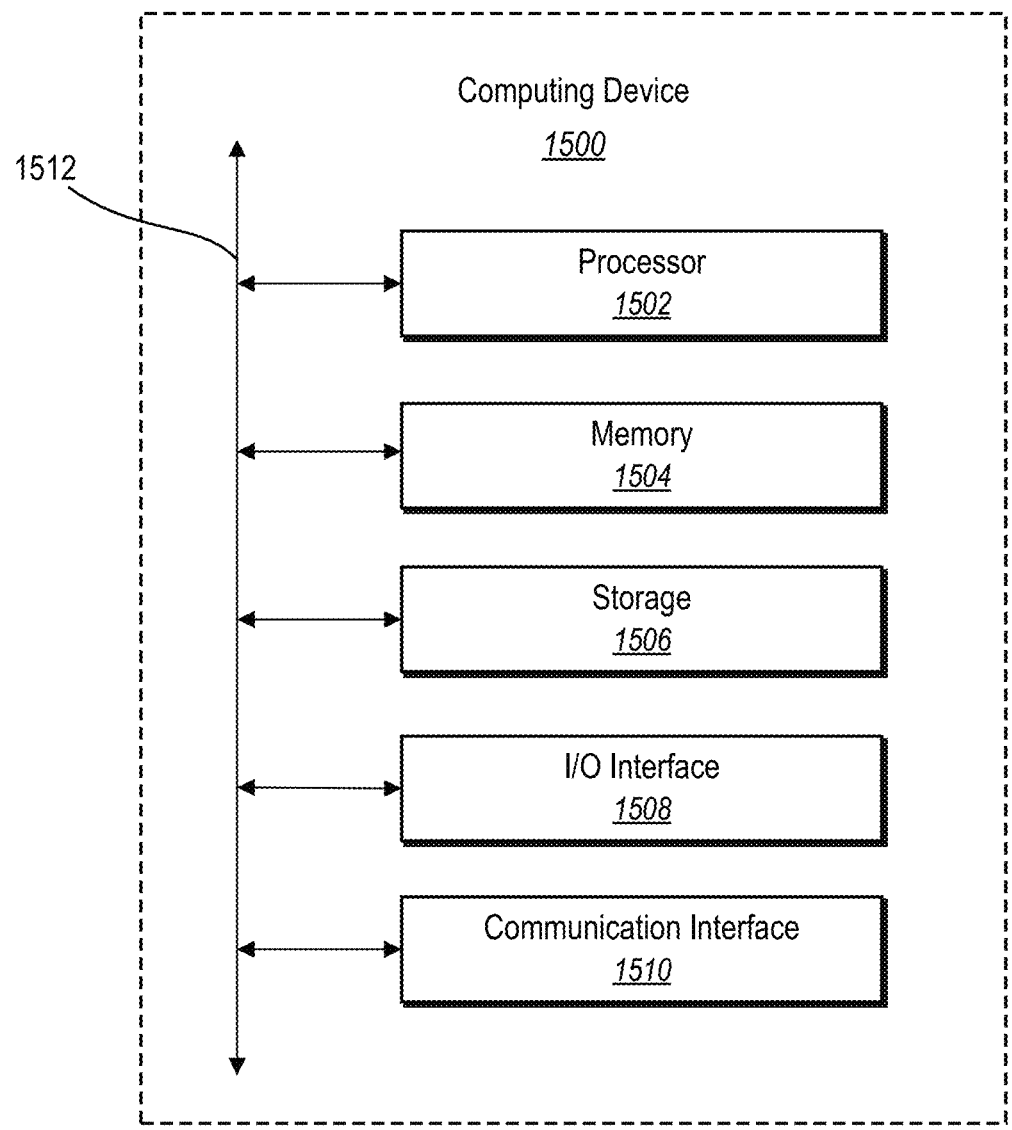
FIG. 15 illustrates a block diagram of an example computing device in accordance with one or more embodiments.

FIG. 15 illustrates, in block diagram form, an example computing device 1500 (e.g., the computing device 1300, the client device 116, and/or the server(s) 104) that may be configured to perform one or more of the processes described above. One will appreciate that the latent vector image editing system 102 can comprise implementations of the computing device 1500. As shown by FIG. 15, the computing device can comprise a processor 1502, memory 1504, a storage device 1506, an I/O interface 1508, and a communication interface 1510. Furthermore, the computing device 1500 can include an input device such as a touchscreen, mouse, keyboard, etc. In certain embodiments, the computing device 1500 can include fewer or more components than those shown in FIG. 15. Components of computing device 1500 shown in FIG. 15 will now be described in additional detail.

In particular embodiments, processor(s) 1502 includes hardware for executing instructions, such as those making up a computer program. As an example, and not by way of limitation, to execute instructions, processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, storage device 1506 can comprise a non-transitory storage medium described above. The storage device 1506 may include a hard disk drive (HDD), flash memory, a Universal Serial Bus (USB) drive or a combination of these or other storage devices.

The computing device 1500 also includes one or more input or output ("I/O") devices/interfaces 1508, which are provided to allow a user to provide input to (such as user strokes), receive output from, and otherwise transfer data to and from the computing device 1500. These I/O devices/interfaces 1508 may include a mouse, keypad or a keyboard, a touch screen, camera, optical scanner, network interface, modem, other known I/O devices or a combination of such I/O devices/interfaces 1508. The touch screen may be activated with a writing device or a finger.

The I/O devices/interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1508 is configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 can provide one or more interfaces for communication (such as, for example, packet-based communication) between the computing device and one or more other computing devices 1500 or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can comprise hardware, software, or both that couples components of computing device 1500 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by a processing device, cause the processing device to perform operations comprising:
   extracting a latent image vector from an initial digital image displayed via a client device;
   receiving an indication of a user interaction to modify the initial digital image;
   in response to the indication of the user interaction, determining an image-differential metric reflecting a difference between the initial digital image and a modified digital image generated by an image modification neural network based on a change within the latent image vector corresponding to the user interaction; and providing the image-differential metric to the client device for rendering the modified digital image.

2. The non-transitory computer readable medium of claim 1, further comprising instructions that, when executed by the processing device, cause the processing device to perform operations comprising:

based on the latent image vector, providing an initial digital stream to the client device to cause the client device to display the initial digital image; and providing the image-differential metric as part of a modified digital stream to the client device to cause the client device to display the modified digital image in place of the initial digital image.

3. The non-transitory computer readable medium of claim 1, wherein determining the image-differential metric comprises:

modifying the latent image vector utilizing a first computing device in response to the indication of the user interaction to modify the initial digital image;

generating the modified digital image from the modified latent image vector utilizing the image modification neural network on a second computing device; and determining the difference between the initial digital image and the modified digital image utilizing the first computing device.

4. The non-transitory computer readable medium of claim 3, wherein modifying the latent image vector comprises:

determining a vector direction and a measure of change corresponding to the vector direction associated with the user interaction; and modifying the latent image vector in the vector direction according to the measure of change.

5. The non-transitory computer readable medium of claim 1, further comprising instructions that, when executed by the processing device, cause the processing device to perform operations comprising:

modifying the latent image vector in a vector direction corresponding to the user interaction; and generating the modified digital image from the modified latent image vector by performing a GAN-based operation utilizing the image modification neural network.

6. The non-transitory computer readable medium of claim 1, further comprising instructions that, when executed by the processing device, cause the processing device to perform operations comprising:

receiving the indication of the user interaction to modify the initial digital image by receiving an indication of a user interaction selecting one or more additional digital images to combine with the initial digital image;

generating a modified latent image vector by combining the latent image vector with one or more additional latent image vectors corresponding to the one or more additional digital images; and based on the modified latent image vector, generating the modified digital image depicting a combination of image features from the initial digital image and the one or more additional digital images utilizing the image modification neural network.

7. The non-transitory computer readable medium of claim 6, further comprising instructions that, when executed by the processing device, cause the processing device to perform operations comprising:

receiving the indication of the user interaction to modify the initial digital image by receiving an indication of a user interaction to modify an image feature of the initial digital image;

modifying the latent image vector to represent the modified image feature in a modified latent feature vector; and generating the modified digital image based on the modified latent feature vector utilizing a generative adversarial neural network (GAN) as the image modification neural network.

8. The non-transitory computer readable medium of claim 1, further comprising instructions that, when executed by the processing device, cause the processing device to perform operations comprising:

providing, for display on the client device, an image modification interface comprising a sketch tool for drawing strokes on the initial digital image; and based on receiving an indication of strokes drawn on the initial digital image, providing the image-differential metric to the client device for rendering the modified digital image comprising an overlay of additional image features corresponding to the strokes.

9. A system comprising:

one or more memory devices comprising an image modification neural network; and one or more processors that are configured to cause the system to:

extract an initial latent image vector from an initial digital image displayed via a client device;

receive an indication of a user interaction to modify the initial digital image;

in response to the indication of the user interaction, generate an image-differential metric reflecting a difference between the initial digital image and a modified digital image by:

generating, utilizing the image modification neural network, the modified digital image reflecting an image modification to the initial digital image based on a change within the initial latent image vector corresponding to the user interaction; and determining the difference between the initial digital image and the modified digital image; and provide the image-differential metric to the client device for rendering the modified digital image.

10. The system of claim 9, wherein the one or more processors are further configured to cause the system to:

receive an additional indication of an additional user interaction to modify the initial digital image;

in response to the additional indication of the additional user interaction, generate an additional image-differential metric indicating a difference between the modified digital image and a further modified digital image; and provide the additional image-differential metric as part of a digital stream to the client device for rendering the further modified digital image in place of the modified digital image.

11. The system of claim 9, wherein the one or more processors are further configured to cause the system to:

extract the initial latent image vector from the initial digital image displayed via a mobile device as the client device; and provide the image-differential metric to the mobile device in response to the user interaction.

12. The system of claim 9, wherein the one or more processors are further configured to cause the system to:

generate the modified digital image by processing a modified latent image vector corresponding to the change within the initial latent image vector utilizing the image modification neural network on a server device at a first location;

generate the image-differential metric by determining the difference between the initial digital image and the modified digital image via a computing device at a second location; and provide the image-differential metric for rendering the modified digital image within a browser on the client device at a third location.

13. The system of claim 9, wherein the one or more processors are further configured to cause the system to:

provide, for display on the client device, an image modification interface comprising a grid of digital images;

receive the indication of the user interaction by receiving an indication of moving the initial digital image to overlay additional digital images within the grid of digital images; and provide the image-differential metric to the client device for rendering the modified digital image depicting a combination of image features from the initial digital image and the additional digital images within the grid of digital images.

14. The system of claim 13, wherein the one or more processors are further configured to cause the system to:

receive an indication of a first amount of a first additional digital image underlying the initial digital image within the grid of digital images;

receive an indication of a second amount of a second additional digital image underlying the initial digital image within the grid of digital images; and generate a modified latent image vector by proportionally combining the initial latent image vector with a first additional initial latent image vector and a second additional latent image vector respectively according to the first amount and the second amount.

15. The system of claim 9, wherein the one or more processors are further configured to cause the system to:

provide, for display on the client device, an image modification interface comprising a depiction of the digital image and slider elements selectable to adjust image features of the initial digital image; and based on receiving an indication of a slider element adjusting image features of the initial digital image, provide the image-differential metric to the client device for rendering the modified digital image comprising adjusted image features.

16. The system of claim 9, wherein the one or more processors are further configured to cause the system to provide, for display on the client device, an image modification interface comprising a depiction of the initial digital image, slider elements selectable to selectable to adjust image features of the initial digital image, and a slidable bar selectable to simultaneously adjust multiple image features of the initial digital image.

17. The system of claim 9, wherein the one or more processors are further configured to cause the system to:

provide, for display on the client device, an image modification interface comprising a collage tool for selecting image features from an additional digital image to combine with the initial digital image; and based on receiving an indication of selected imaged features from the additional digital image, provide the image-differential metric to the client device for rendering the modified digital image depicting a combination of image features from the initial digital image and selected image features from the additional digital image.

18. A computer-implemented method for digital image editing utilizing a latent vector approach for implementing neural network modifications, the computer-implemented method comprising:

extracting a latent image vector from an initial digital image displayed via a client device;

receiving an indication of a user interaction to modify the initial digital image;

in response to the indication of the user interaction, determining an image-differential metric reflecting a difference between the initial digital image and a modified digital image generated by an image modification neural network based on a change within the latent image vector corresponding to the user interaction; and providing the image-differential metric to the client device for rendering the modified digital image.

19. The computer-implemented method of claim 18, wherein extracting the latent image vector comprises providing the initial digital image to a computing device for extracting the latent image vector from the initial digital image utilizing a generative adversarial neural network (GAN).

20. The computer-implemented method of claim 18, further comprising:

based on the latent image vector, providing an initial digital stream to the client device to cause the client device to display the initial digital image; and providing the image-differential metric as part of a modified digital stream to the client device to cause the client device to display the modified digital image in place of the initial digital image.

* * * * *